(12) United States Patent
Schinkel et al.

(10) Patent No.: US 9,644,789 B2
(45) Date of Patent: May 9, 2017

(54) SPRING BALANCED SUPPORT DEVICE

(71) Applicant: H. SCHINKEL HOLDING B.V., Utrecht (NL)

(72) Inventors: Michaël Hubert Schinkel, Utrecht (NL); Edouard Frans Alexander Schinkel, Amsterdam (NL)

(73) Assignee: H. SCHINKEL HOLDING B.V., Utrecht (NL)

( * ) Notice: Subject to any disclaimer, the term of this patent is extended or adjusted under 35 U.S.C. 154(b) by 0 days.

(21) Appl. No.: 14/654,817

(22) PCT Filed: Dec. 21, 2012

(86) PCT No.: PCT/NL2012/050921
§ 371 (c)(1),
(2) Date: Jun. 22, 2015

(87) PCT Pub. No.: WO2014/098568
PCT Pub. Date: Jun. 26, 2014

(65) Prior Publication Data
US 2015/0338019 A1 Nov. 26, 2015

(51) Int. Cl.
*E04G 3/00* (2006.01)
*F16M 13/02* (2006.01)
(Continued)

(52) U.S. Cl.
CPC ........... *F16M 13/022* (2013.01); *B64F 1/368* (2013.01); *F16M 11/046* (2013.01);
(Continued)

(58) Field of Classification Search
CPC . F16H 21/21; F16H 11/12; F16F 1/00; F16M 13/022; F16M 11/046
See application file for complete search history.

(56) References Cited

U.S. PATENT DOCUMENTS 4,372,005 A * 2/1983 Inesso ..................... E05F 3/108
16/52
4,387,876 A 6/1983 Nathan
(Continued)

OTHER PUBLICATIONS

International Search Report and Written Opinion—PCT/NL2012/050921—Dated Sep. 20, 2013.

*Primary Examiner* — Amy Sterling
(74) *Attorney, Agent, or Firm* — Banner & Witcoff, Ltd.

(57) ABSTRACT

A spring balanced support device having at least one arm, connected to its surroundings via a movable pivot point, forming an arm mechanism to which a mass may be coupled directly or indirectly at a mass coupling point, balanced by at least one spring, at one end directly or indirectly connected to the arm mechanism at a spring connection point, the other end directly or indirectly connected to the surroundings at a spring base point, wherein the spring base point is located substantially on an axis which extends through the movable pivot point and substantially parallel to a direction of a force exerted on the spring balanced support device at the mass coupling point due to the force of gravity on the mass, or wherein the spring base point is located at a distance from said axis along a line which intersects the axis and which extends substantially parallel to a pivot point axis of the movable pivot point, wherein the movable pivot point is movable along the axis in order to adjust the spring balanced support device.

14 Claims, 16 Drawing Sheets

(51) Int. Cl.
*F16M 11/04* (2006.01)
*F16M 11/08* (2006.01)
*F16M 11/20* (2006.01)
*F16M 11/24* (2006.01)
*F16M 11/42* (2006.01)
*B64F 1/36* (2017.01)

(52) U.S. Cl.
CPC ......... *F16M 11/08* (2013.01); *F16M 11/2014* (2013.01); *F16M 11/2085* (2013.01); *F16M 11/2092* (2013.01); *F16M 11/24* (2013.01); *F16M 11/425* (2013.01); *F16M 13/027* (2013.01); *F16M 2200/047* (2013.01); *F16M 2200/048* (2013.01)

(56) References Cited

U.S. PATENT DOCUMENTS

| | | |
|---|---|---|
| 4,883,249 A | 11/1989 | Garland |
| 4,969,625 A | 11/1990 | Singer et al. |
| 8,353,199 B1 * | 1/2013 | Ma .................... B64F 5/0045 108/136 |

\* cited by examiner

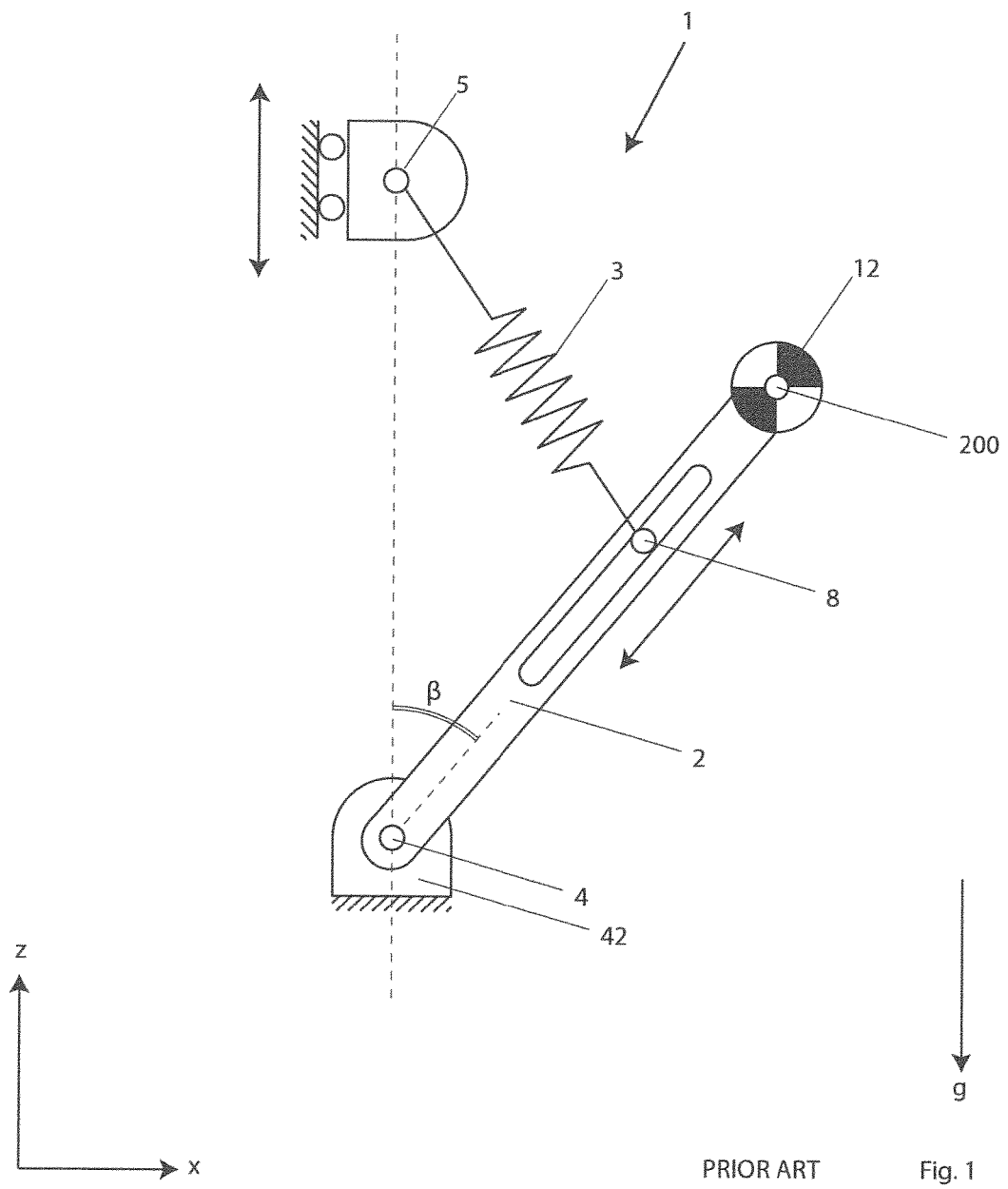
PRIOR ART    Fig. 1

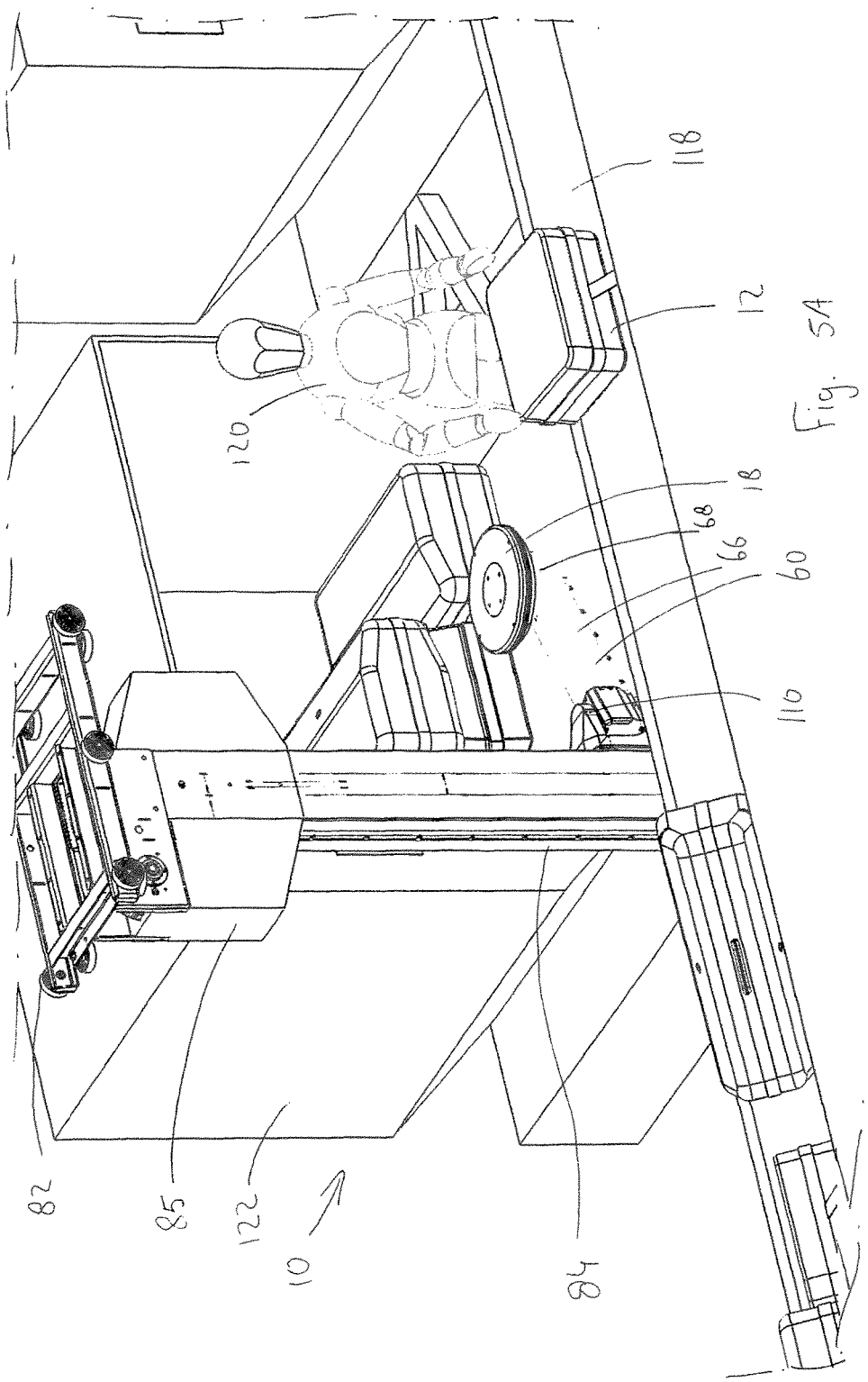

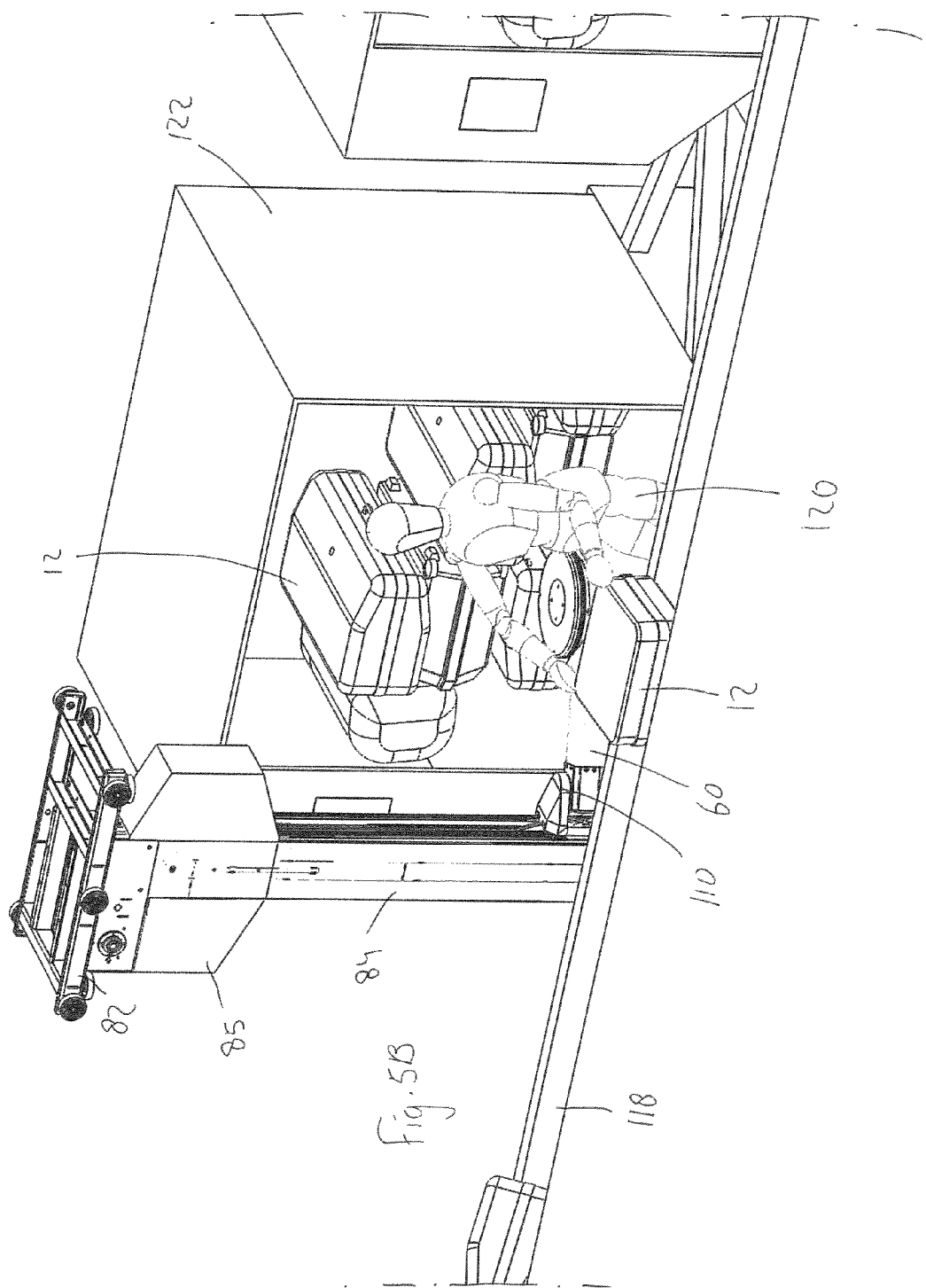

SPRING BALANCED SUPPORT DEVICE

CROSS-REFERENCE TO RELATED APPLICATIONS

This application is a national stage application of co-pending PCT application PCT/NL2012/050921 filed Dec. 21, 2012. The disclosure of this application is expressly incorporated herein by reference in its entirety.

FIELD OF THE INVENTION

The present invention relates to a spring balanced support device for counteracting the force of gravity on a mass. The present invention further relates to several methods of engaging the spring balanced support device for different applications. Spring balanced support devices are known.

DESCRIPTION OF RELATED ART

U.S. Pat. No. 4,387,876 and U.S. Pat. No. 4,883,249 disclose examples of spring balanced support devices. These spring balanced support devices comprise an arm mechanism and a spring which counteracts a weight of mass. The moment about a pivot point generated by the spring equals the moment generated by the weight of its balanced mass. The devices of U.S. Pat. No. 4,387,876 and U.S. Pat. No. 4,883,249 comprise an adjusting mechanism for adjusting the spring in order to balance a different weight.

THE INVENTION

It is an object of the invention to provide an improved spring balanced support device.

To this end, the invention provides a spring balanced support device comprising at least one arm, connected to its surroundings via a movable pivot point, forming an arm mechanism to which a mass may be coupled directly or indirectly at a mass coupling point, balanced by at least one spring, at one end directly or indirectly connected to the arm mechanism at a spring connection point, the other end directly or indirectly connected to the surroundings at a spring base point, wherein the spring base point is located substantially on an axis which extends through the movable pivot point and substantially parallel to a direction of a force exerted on the spring balanced support device at the mass coupling point due to the force of gravity on the mass, or wherein the spring base point is located at a distance from said axis along a line which intersects the axis and which extends substantially parallel to a pivot point axis of the movable pivot point, wherein the movable pivot point is movable along the axis in order to adjust the spring balanced support device.

In the spring balanced support devices according to U.S. Pat. No. 4,387,876 and U.S. Pat. No. 4,883,249, a spring is provided to balance the moment generated by the weight of its balanced mass. In this respect, the present invention is similar to the devices of U.S. Pat. No. 4,387,876 and U.S. Pat. No. 4,883,249. The known devices comprise an adjusting mechanism for adjusting the device to balance a different weight. The adjusting device works by adjusting the spring.

In U.S. Pat. No. 4,387,876 and U.S. Pat. No. 4,883,249 several embodiments are shown. The adjusting mechanism operates on the basis of adjusting one of the mount positions of the spring. Either the end of the spring which is attached to the arm mechanism, or the end of the spring which is attached to the surroundings (i.e. the base) is adjusted. In this way, for any given position of the arm, the moment which the spring exerts on the arm, can be adjusted to another constant value. In U.S. Pat. No. 4,387,876 the adjustment is carried out by a knob 32 which is used to vary the position of the slider 38 via which the spring is connected to the arm mechanism. It is the end of the spring which is attached to the arm mechanism which has an adjustable position. In U.S. Pat. No. 4,883,249 it is the position of the base end of the spring which is adjustable. For instance in FIG. 9, the element 99 can be rotated to vary the height of element 98. FIG. 25 shows a similar construction.

These devices were found to be suitable only for adjusting for loads having relatively small variations in weight. These devices are also quite complex to construct and are quite slow in adjusting for a different weight, or have other limitations. These devices are for example not suitable for pick and place operations.

The present invention is different from these constructions in that adjusting the spring balanced support device is executed by moving a part of the arm mechanism itself, by a translation of the movable pivot point. The arm mechanism has no fixed points, all parts of the arm mechanism are movable in at least one direction.

Moving the pivot point of the arm mechanism appears counter-intuitive because the arm mechanism itself is no longer connected to any fixed point in space.

Furthermore, the adjusting of the arm mechanism may influence the position of the mass. This may be seen as a disadvantage. In an embodiment, the invention provides measures to counteract this tendency. The adjusting of the arm mechanism also changes the range of the arm mechanism, which may also be seen as a disadvantage of the invention. This can be counteracted by dimensioning the spring balanced support device properly for the required application.

The invention has a number of advantages. Moving the pivot point of the arm mechanism was found to reduce the construction effort necessary to build an adjustable spring balanced support device, allowing a simpler construction of both the spring balanced support device and its adjustment mechanism, requiring less components. Further, the spring balanced support device has a low friction in use. A preferred and simple embodiment was found in which the adjustment can be executed with zero force in a certain position of the arm mechanism, which is referred to as its "phantomspring" position. This enables a very energy efficient adjustment of the spring balanced support device.

With a simple construction, low friction, and enabling quick adjustment with low force necessary for the adjustment, spring balanced support devices according to the invention are suitable for various applications in different categories of use.

The invention may be used in a broad range of different applications/use. Some of the advantages may not be achieved in every application.

One main category of use is a pick and place operation. Typical pick and place operations may for instance take place in airports where luggage needs to be transferred from a conveyor belt onto a lorry or vice versa. Other pick and place operations take place in the construction industry, where loads of bricks or bags of cement or other articles need to be loaded or unloaded from a lorry to a building site or where loads need to be positioned, for example without sufficient manpower to hold or manoeuvre the load. Other kinds of pick and place operations may take place along assembly lines. Other pick and place operations occur in logistical operations, such as package delivery services, and many other situations. Other types of pick and place operations may take place in other types of businesses, such as newspaper or other printing & publication businesses, where packs of newspapers or magazines need to be loaded onto a pallet or lorry or crate.

Further kinds of pick & place operations may relate to picking and placing of people, i.e. picking up of one or more persons, weighing the one or more persons, moving the one or more persons to another location and placing said persons at said location.

Other applications where the invention can be used for pick and place operations may relate to situations where the impact on either the system or the load (or both) needs to be reduced or avoided.

Another situation is known from moving vessels that need to be loaded or unloaded, or in other situation where a load is lifted by a crane or other lifting device. In such a situation, it is beneficial for the mass to be suspended in a balanced manner instead of in a fixed manner.

Common for many of these situations is that loads of often varying and unknown weight need to picked up at one location, moved to a target location and placed or released at said target location. However, even if the load is known in advance and is the same for each pick and place operation, the picking and placing operation itself results in a varying load exerted on the spring balanced support system.

The coupling and decoupling of the load with the spring balanced support device are defining moments for the use of the spring balanced support device in this category of application. In this respect, pick & place operations are different from applications where the main use is a balanced movement of a mass which stays attached to the spring balanced support device.

A pick and place operation according to the invention may work very intuitively. Because the force for counteracting the force of gravity is provided by a spring, a drive or actuator is not required for the vertical movement of the mass. This results in at least the upward and downward movement being performed by muscle power of the operator. This results in a smoother and mostly quicker operation than if a drive or actuator were to be used. However, the invention is not limited to embodiments without a drive or actuator. A drive or actuator could for instance be used for the horizontal movement of the object, for the movement of the whole spring balanced support device in any direction, or for the adjusting process, as is discussed below.

The invention may also be engaged in a category of applications where it is used mainly for balanced movement of the mass, where no picking or placing takes place or very little picking and placing takes place, in other words in situations where a load, once engaged with the spring balanced support device, is more or less continuously connected to the spring balanced support device. Sometimes, the load varies only gradually in time or at certain limited moments in time only. In these cases the mass, part of the mass or more of the same kind of mass is almost continuously being connected to the spring balanced support device.

The invention may also be used in another category of applications wherein the load itself is kept in a stationary position when the surroundings move. Such a situation is known from measuring devices carried by a person which need to be kept stable. The measuring device may be a camera or a different measuring device. The person moves, but the measuring device needs to be kept as stable as possible. Yet another application is in suspension systems in for example the automotive industry.

It is implicit to a spring balanced support device that the spring balances the force at the mass coupling point for different angular positions of the first arm. The axis will generally be vertical, but this need not be the case. It is also possible that the first direction and the axis extend at a different angle to the horizontal. The axis may be horizontal.

In an embodiment, the arm mechanism comprises a second arm which is pivotably connected to the first arm at an elbow pivot point (or elbow joint), wherein the second arm is further coupled to the surroundings via a second movable pivot point which is movable substantially parallel to said axis. Generally but not always the second movable pivot point will be movable substantially along said axis. The second arm creates a possibility of a simple linear movement of the mass coupling point, i.e. eliminates movements of the mass transverse to the axis. There will still be considerable forces transverse to the axis, which disadvantage can be solved as seen explained below. Generally but not always, the arms have substantially the same length, and the elbow pivot point will be located at the same distance to the axis on both arms. This results in the feature that the two movable pivot points are located substantially at a same distance to the elbow pivot point(s), which is relevant for an exact zero force adjustment It was found that the combination of a movable pivot point and a mechanism having two arms was very practical, because the construction for a linear movement of the mass coupling point can be simply combined with the construction for linear movement of the adjusting of the first movable pivot point.

In an embodiment, the arm mechanism comprises a second arm which is pivotably connected to the first arm at an elbow pivot point and further comprises a third arm and a fourth arm, which are pivotably connected with the first and second arm in a substantially parallelogram configuration, wherein the fourth arm is connected to the second arm at a second movable pivot point.

The four arms may be connected to one another substantially at their ends. The lower end of the first arm and the upper end of the second arm may define a vertical axis. The second movable pivot point may be movable along the axis and in a direction transverse to the axis. It is noted that the axis may also have a different orientation than vertical in which case the lower end need not be a "lower" end. This embodiment has the benefit that all forces on the axis transverse to the axis cancel each other out.

In a different embodiment, the spring balanced support device comprises a second arm, connected to the first arm via a pivot connection, the second arm having a fixed orientation with respect to the axis and being movable substantially along the axis, the pivot connection being slideable along the first or the second arm. The pivot connection may be arranged in a cam on one of the arms. The second arm will generally be slideably arranged on a carriage.

In an embodiment, the mass is coupled directly or indirectly to the arm mechanism at the second movable pivot point.

In an embodiment, the arm mechanism is not connected to any fixed base and each part of the arm mechanism is movable at least in a direction parallel to said axis, wherein in particular none of the one, two or four arms of the arm mechanism are directly connected to a fixed base.

The position of the spring connection point may be fixed and non-adjustable and/or the position of the spring base point may be fixed and non-adjustable. By fixing the ends of the spring, a simple construction is created. This is different from for instance U.S. Pat. No. 4,387,876 and U.S. Pat. No. 4,883,249 wherein either the base end or the mechanism end of the spring is adjusted.

In an embodiment, the second movable pivot point is operable to be positioned at a predetermined distance from the spring base point, wherein a change in potential energy of the arm mechanism as a result of a movement of the first pivot point is substantially the same as a change in spring energy in the least one spring as a result of said movement.

During the adjusting process of the first movable pivot point, the second movable pivot point is maintained in a certain position at the level of the spring base point at the moment of engaging or disengaging of the mass. This results in an adjustment procedure with zero force or substantially zero force. The second movable pivot point may be positioned just offset of the spring base point in order to compensate for the own weight of the arm mechanism. The second movable pivot point may be maintained at substantially the same position by adjusting the spring balanced support device to the changed mass so quickly that the second movable pivot point generally does not change in position, by a lock of any kind, or by a combination of these two methods.

In an embodiment, the spring balanced support device may further comprise a brake device constructed to fixate the second movable pivot point during the adjusting step. The brake device may be operated manually or be connected to a control device.

The spring balanced support device may further comprise a brake device constructed to alternately:
during an adjusting step, fixate a position of the mass coupling point along said axis while allowing a movement of the (first) movable pivot point along said axis,
during a balancing step, fixate the position of the (first) movable pivot point along said axis while allowing a movement of the mass coupling point along said axis.

It will be appreciated that the device has two modes, i.e. an adjustment mode for an adjusting step and a balancing mode for a balancing step. The fixating of the first movable pivot point may be performed by the actuator which also moves the movable pivot point. It will be appreciated that fixating the position of the second movable pivot point during the adjusting step may be also done by adjusting very quickly.

If the axis extends vertical, the movable pivot point is situated essentially vertically underneath the spring base point which bears the spring force, and moves vertically along the axis. It will be understood that relatively small deviations of the alignment between the force at the mass coupling point and the axis disadvantageously affect the balancing effect of the spring somewhat but fall within the scope of the invention.

The spring balanced support device may further comprise:
a weighing device configured to weigh the mass which is supported by a mass support member,
an actuator being constructed to move the movable pivot point,
a control device being connected to the weighing device and to the actuator, wherein the control device is configured to control the actuator for adjusting the position of the movable pivot point on the basis of a signal of the weighing device which is indicative of the measured weight of the mass.

With this embodiment, the adjusting of the spring balanced support device to a new weight can be performed quickly and automatically or semi-automatically. This allows relatively fast and reliable pick and place operations.

In a further embodiment, the brake device is also coupled to the control device, the control device being configured to fixate the position of the mass coupling point along said axis during the weighing of the mass. This allows fast measuring of the weight and adjusting to the new mass.

In an embodiment, the weighing device is coupled directly to a mass support member which is configured to engage the mass.

In an embodiment, the weighing device comprises a load cell and an accelerometer, the load cell and accelerometer each being connected to the control device. The control device is configured to determine the weight of the mass on the basis of the data of the load cell and the accelerometer. This embodiment allows measuring of the weight without holding the mass stationary and increases the operating speed.

In an embodiment, the spring is connected to the arm mechanism at the elbow connection between the first arm and second arm, and—in case of an arm mechanism comprising four arms—the springs are connected to the arm mechanism at the respective elbow connections. A connection of the spring at the elbow joint(s) is preferable because it results in an efficient use of the spring force. It also enables zero force adjustment. A connection of the spring to the second arm will result in some loss of equilibrium at varying positions of the load and will normally not be preferable option, but falls within the scope of the invention. The skilled person will understand that the word "springs" in case of a four arm mechanism also comprises a single spring having two sections and extending between both elbow connections via the spring base point.

In an embodiment, the mass coupling point is located substantially on the axis. The force exerted at the mass coupling point may be aligned with the axis.

In an embodiment, the spring balanced support device comprises:
a wagon comprising wheels or skidding members,
a frame being connected to said wagon, the frame extending over a vertical distance,
wherein the arm mechanism and the at least one spring are connected to said frame.

The wagon allows great horizontal movements of an object, or allows the movement of the support device to another pick & place location. The wagon may roll or skid on rails. The rails may extend below or above the wagon as an overhead rail. The support device according to the invention may also be mounted otherwise, for example on a free roaming wagon on wheels. The wagon may be self propelled, i.e. be a motorized vehicle, and may be driven on a public road.

In an embodiment, the spring balanced support device comprises a transmission device being mechanically interposed between the mass and the arm mechanism, the transmission device being configured to cause a ratio of a vertical movement of the mass coupling point and a vertical movement of the mass itself to be less than 1:1.25 or more than 1:0.75.

The transmission device is coupled at an input side thereof to the mass support member and coupled at an output side to the mass support member connection. The transmission device creates an advantage in that the vertical operating range of the mass support member can be increased or decreased. The transmission device may comprise a pair of pulleys having a different diameter or gears or have a different suitable form. A single pulley having two different diameters or a scissor mechanism are other possibilities for the transmission device and other options for the transmission device are conceivable.

If the ratio is greater than 1:0.75, very precise vertical movements of the object are possible in a limited range.

In an embodiment, the spring balanced support device comprises a protruding arm which is connected directly or indirectly to the arm mechanism, wherein the protruding arm extends over a horizontal distance, wherein the protruding arm is connected to a carriage which is guided by a rail which extends parallel to said axis. The rail and carriage bear the moment caused by the weight multiplied by the length of the arm. In particular, the rail may be fixed to the frame, so that the protruding arm is coupled to the frame via the carriage which is guided by the rail and arranged to move parallel to said axis relative to said frame.

In an embodiment, the protruding arm is connected directly or indirectly to the arm mechanism via a hinge having a vertical axis. The hinge allows the arm to pivot, creating an operating range about the vertical axis.

The protruding arm may be segmented and comprise a first arm part and a second arm part being coupled to one another via a sliding or rolling device, the second arm part being movable in a horizontal direction relative to the first arm part. The segmented arm allows relatively high-precision horizontal movements of the object without needing to move the arm mechanism in a horizontal direction. More segments are also possible.

In an embodiment, the spring balanced support device further comprises a pulley device comprising an upper pulley, a lower pulley and an endless flexible member being supported by the upper and lower pulley and extending at least in part parallel to said rail, wherein the carriage is connected to said endless flexible member. The mass support member is indirectly coupled to the arm mechanism via the pulley device. The pulley device may comprise a lock. This has the benefit of a safe guiding of the mass support member via the carriage and a rail. A brake device may be provided which brakes the endless loop in both directions. Undesired, sudden movements may advantageously be prevented with the lock. The rail generally extends vertically.

In an embodiment, the at least one spring is attached to a fixed spring base via the spring base point wherein the fixed base and the at least one spring are located at a distance from the operating range of the arm mechanism, for instance outside a region which is defined by the range of operation of the first movable pivot point and the range of operation of the second movable pivot point or at a distance from a plane defined by the first arm and the axis. For some applications the region may be more particularly defined by a first plane oriented at a right angle to the axis and extending through the end of the range of the first movable pivot point and a second plane oriented at a right angle to the axis and extending through the end of the range of the second movable pivot point. For other applications the at least one spring may be located very close to the operating range of the arm mechanism, but not within the operating range by placing it right next to it in another plane, i.e. at a distance from a plane defined by the first arm and the axis.

A position of the springs which is remote from the position of the arm mechanism has several benefits. It does not require the use of zero length springs, and it allows the arm mechanism and the springs to be positioned where the space is most optimal. For instance, when the arm construction is provided in a movable frame, the movable frame being supported by a wagon which rolls on wheels, the arm mechanism itself can be positioned relatively high, above the operator and out of the way of the objects which are to be picked and placed. The at least one spring may be located below the lower end of the first arm. The remote location of the spring(s) allows long springs to be used, which creates a relatively constant force over a substantial range.

In an embodiment, the spring balanced support device according to any of the preceding comprises a hand grip directly or indirectly connected to the first movable pivot point for manually adjusting the position of said first movable pivot point and/or comprising an actuator which is manually operable, i.e. without a control device. The hand grip allows simple adjusting of the spring force.

In an embodiment, the brake device may comprise one or more of the following brake members:
1) a first brake member for braking a vertical movement of the mass, and
2) a second brake member for braking a horizontal movement of the second protruding arm segment relative to the first protruding arm segment, and
3) a third brake member for braking the pivoting movement of the arm about pivot axis,
4) a fourth brake member for braking a pivoting movement of the object support member.
wherein the one or more brake members are connected to the control device via communication lines, the control device being configured to switch the one or more brake members on or off, all together or in a particular sequence The present invention further relates to a method of supporting a mass, the method comprising
providing a spring balanced support device comprising at least one arm, connected to its surroundings via a movable pivot point, forming an arm mechanism to which a mass may be coupled directly or indirectly at a mass coupling point,
balanced by at least one spring, at one end directly or indirectly connected to the arm mechanism at a spring connection point, the other end directly or indirectly connected to the surroundings at a spring base point,
wherein the spring base point is located substantially on an axis which extends through the movable pivot point and substantially parallel to a direction of a force exerted on the spring balanced support device at the mass coupling point due to the force of gravity on the mass, or wherein the spring base point is located at a distance from said axis along a line which intersects the axis and which extends substantially parallel to a pivot point axis of the movable pivot point,
wherein the movable pivot point is movable along the axis in order to adjust the spring balanced support device,
the method further comprising:
engaging the mass with the spring balanced support device,
adjusting the position of the first movable pivot point so that the spring balanced support device generates a spring force which balances the weight of the mass, and
moving the mass relative to the spring balanced support device.

The method provides the same advantages as the device. It is noted that the mass may be moved with the spring balanced support device, but it is also possible to keep the mass still and let the spring balanced support device move. This may arise in the carrying of a measuring device by a human or the use of the invention on board a moving vessel for providing a stationary position for the mass. Other applications are also conceivable.

In an embodiment, the method comprises disengaging said mass from the spring balanced support device after the moving of the mass relative to the spring balanced support device.

In an embodiment, the method comprises repeatedly engaging and disengaging a mass with the spring balanced support device, wherein at each moment of engaging and disengaging, the mass coupling point has a substantially same position.

The device according to the invention has a position in which an adjustment with zero force is possible. By each time engaging the mass with the spring balanced device at said zero force position, referred to as its "phantomspring" position, little energy is required for the adjustment process.

In an embodiment of the method, the arm mechanism comprises at least a second arm which is pivotably connected to the first arm at an elbow pivot point, wherein the second arm is further coupled to the surroundings via a second movable pivot point which is movable substantially along said axis, wherein the spring base point is located substantially along said axis and within an operating range of the second movable pivot point along said axis, the method comprising engaging or disengaging the mass by the spring balanced support device in a position wherein the second movable pivot point is positioned at or near the position of the spring base point along said axis, in which position a change in potential energy of the arm mechanism as a result of the moving of the first movable pivot point is substantially the same as a change in spring energy in the at least one spring.

The second movable pivot point and the spring base point may be slightly offset in order to compensate for the own weight of the arm mechanism.

These positions of the second movable pivot point and the spring base axis enable an adjusting step with zero force. The length of the spring changes relatively little and essentially only enough to compensate for the change in potential energy of the arms. In this position, the first movable pivot point can be moved without exerting any force or with very little force. This is a very efficient way of adjusting the device. If done repeatedly, the advantage may also be achieved repeatedly.

In an embodiment of the method, the spring balanced support device further comprises an adjustment device comprising:
 a weighing device configured to weigh the mass which is supported by the spring balanced support device,
 an actuator being constructed to move the movable pivot point,
 a control device being connected to the weighing device and to the actuator, wherein the control device is configured to control the actuator for adjusting the position of the movable pivot point on the basis of a signal of the weighing device which is indicative of the measured weight of the mass,
the method comprising weighing the mass with the weighing device and automatically adjusting the movable pivot point with the actuator on the basis of a signal generated by the control device, the signal being indicative of the weight of the mass. This method allows relatively high speed pick and place operations.

The spring balanced support device may further comprise a manual adjusting device configured for manually adjusting the first movable pivot point. The manual adjustment device may be provided in addition to the actuator or as an alternative.

In an embodiment, the spring balanced support device further comprises a brake device constructed to fixate the mass in a vertical direction, the brake device being coupled to the control device, wherein the control device is configured to fixate the vertical position of the mass support member during the weighing of the mass, the method comprising fixating the vertical position of the mass with the brake device during the weighing of the mass.

In a different aspect, the present invention relates to a spring balanced support device comprising:
 an arm mechanism comprising at least a first arm, wherein the arm mechanism is connected to the surroundings via a first pivot point,
 a mass support member constructed for supporting the mass, the mass support member being coupled directly or indirectly to the arm mechanism, and in use exerting a weight force in a first direction on the arm mechanism due to a weight of the mass,
 at least one spring, at one end directly or indirectly connected to the arm mechanism at a spring connection point, the other end directly or indirectly connected to the surroundings at a spring base point, the spring being configured to exert a spring force (F) on the arm mechanism which counteracts the weight of the mass, wherein the first pivot point and the spring base point define an axis which is substantially parallel with the first direction,
 an adjustment device configured to adjust the magnitude of the spring force for a given position of the mass support member, in order to allow a balanced support for different masses having different weights, wherein the adjustment device comprises:
  a weighing device configured to weigh the mass which is supported by the mass support member,
  an actuator being constructed to move the pivot point, the spring base point, and/or the spring connection point,
  a control device being connected to the weighing device and to the actuator, wherein the control device is configured to control the actuator for adjusting the position of the pivot point, the spring base point, and/or the spring connection point on the basis of a signal of the weighing device which is indicative of the measured weight of the mass.

With the invention, fast and reliable pick and place operations can be carried out. Surprisingly, it was found that the combination of the weighing device, actuator and control device can be combined with the feature of the adjustment device which is configured to adjust a position of the first pivot point, but may also be applied independently from this aspect. The actuator may be connected to the spring support or to the spring base point, and/or the spring connection point, in order to adjust the force. This creates a possibility of creating a spring balanced support devices which is derived from the devices disclosed in U.S. Pat. No. 4,387,876 and U.S. Pat. No. 4,883,249, but has an extra quality of being much more suitable for pick and place operations.

The spring balanced support device may comprise a brake device constructed to fixate the mass support member in a vertical direction, the brake device being coupled to the control device, the method comprising fixating the mass support member with the brake device during the weighing of the mass. This brake device is not necessary when the adjustment is executed very quickly, before the mass support member changes its position. This quick adjustment is preferably done in the "phantomspring" position of the spring balanced support device, because there the adjustment requires zero force.

The spring balanced support may comprise any of the features according to claims 2-25.

The present invention further relates to a method of performing a pick-and-place operation, the method comprising:

providing a spring balanced support device comprising:
an arm mechanism comprising at least a first arm, wherein the arm mechanism is connected to the surroundings via a first pivot point,
a mass support member constructed for supporting the mass, the mass support member being coupled directly or indirectly to the arm mechanism, and in use exerting a weight force in a first direction on the arm mechanism due to a weight of the mass,
at least one spring, at one end directly or indirectly connected to the arm mechanism at a spring connection point, the other end directly or indirectly connected to the surroundings at a spring base point, the spring being configured to exert a spring force (F) on the arm mechanism which counteracts the weight of the mass, wherein the first pivot point and the spring base point define an axis which is substantially parallel with the first direction,
an adjustment device configured to adjust the magnitude of the spring force for a given position of the mass support member, in order to allow a balanced support for different masses having different weights, wherein the adjustment device comprises:
a weighing device configured to weigh the mass which is supported by the mass support member,
an actuator being constructed to move the pivot point, the spring base point, and/or the spring connection point,
a control device being connected to the weighing device and to the actuator, wherein the control device is configured to control the actuator for adjusting the position of the pivot point, the spring base point, and/or the spring connection point on the basis of a signal of the weighing device which is indicative of the measured weight of the mass.

the method comprising:
engaging a mass with the mass support member,
weighing the mass with the weighing device and automatically adjusting the magnitude of the spring force with the actuator on the basis of a signal generated by the control device, the signal being indicative of the weight of the mass,
moving said mass relative to the spring balanced support device.

The method provides substantially the same advantages as the device according to this aspect of the invention.

In an embodiment of the method, the spring balanced support device further comprises a brake device constructed to fixate at least the mass support member, the brake device being coupled to the control device, wherein the control device is configured to fixate the position of the mass support member during the weighing of the mass, the method comprising fixating the position of the mass support member in the vertical direction with the brake device during the weighing of the mass.

The method provides substantially the same advantages as the device according to this aspect of the invention.

LIST OF FIGURES

Below, the invention will be explained in more detail by means of exemplary, non-limiting embodiments and with reference to the figures. Like reference numerals denote like parts.

FIG. 1 shows a schematic side view of a spring balanced support device according to the prior art.

FIGS. 5A and 5B show an isometric view of yet another embodiment of the invention in use.

DETAILED DESCRIPTION OF THE FIGURES

Figure 2A:
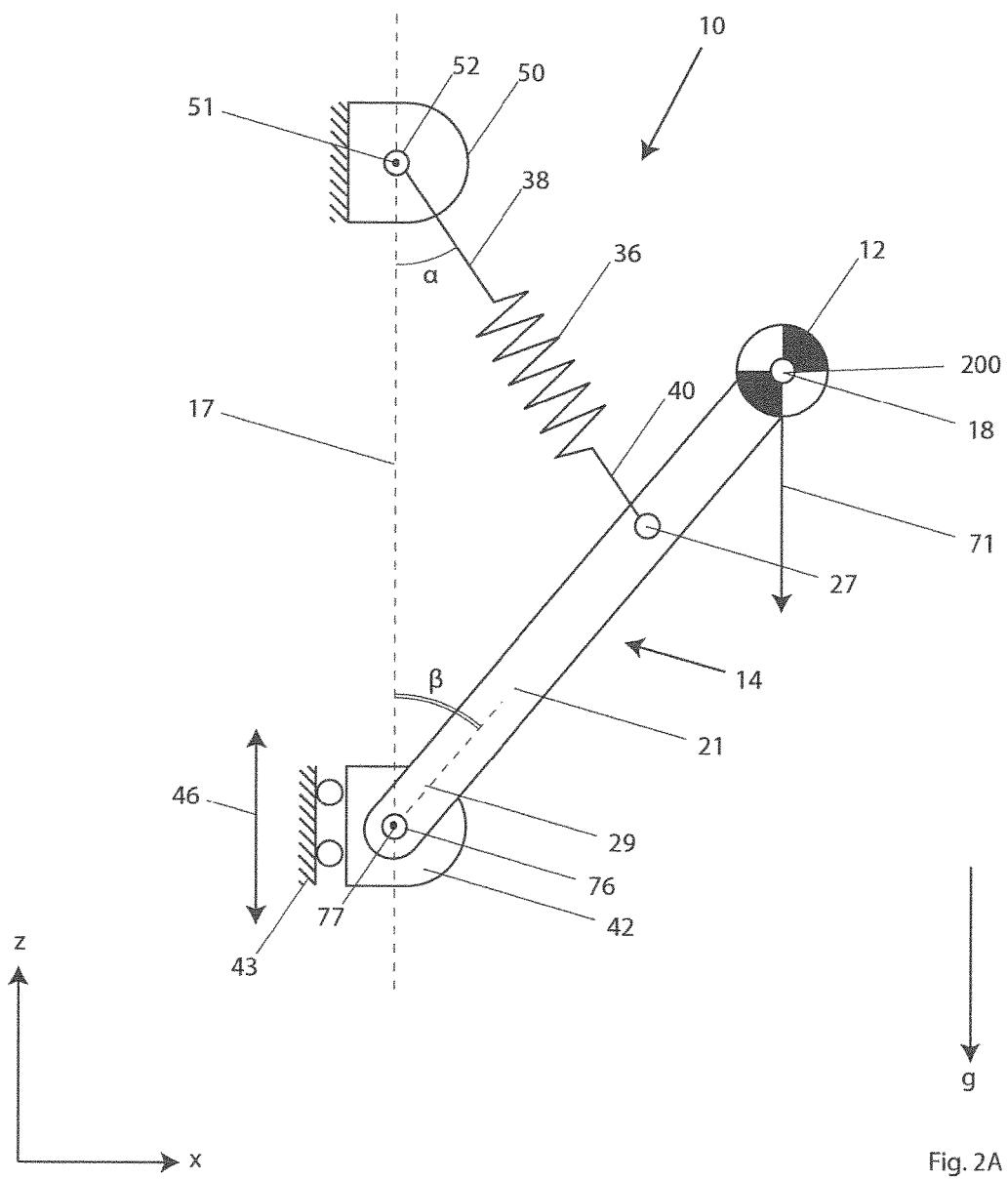
FIG. 2A shows a schematic side view of a first embodiment according to the invention.

Turning to FIG. 1, a spring balanced support device 1 according to the prior art is shown. The spring balanced support device comprises an arm 2, a spring 3, a pivot point 4 which supports a lower end of the arm 2, and a movable base 5 which is configured to adjust the length of the spring for a given position of the arm 2. A further adjustment mechanism is provided via a slider member 8.

The spring balanced support device 1 is configured to support an object 12. If the object is heavy, the movable base 5 is moved upwards and/or the slider 8 is adjusted towards the end of the arm to increase the moment generated by the spring around the pivot point 4.

The device of FIG. 1 is indicative of the solutions provided by U.S. Pat. No. 4,387,876 and U.S. Pat. No. 4,883,249. When considering the moments about pivot 4, it can be found that both the moment of the load 12 and the counteracting moment of the spring 3 about pivot 4 vary with sin β, which results in a perfect equilibrium for all angles β. This is the general principle of spring balanced support devices.

One of the disadvantages of these devices is that pick and place operations are difficult to carry out due to the varying weight. In the present invention, a further insight was developed in that an adjustable spring is in practice quite difficult to construct. This makes the devices of U.S. Pat. No.

4,387,876 and U.S. Pat. No. 4,883,249 quite complex and cumbersome, when put to practice.

Turning to FIG. 2A, a first embodiment of the spring balanced support device 10 according to the invention is shown. The arm mechanism 14 comprises a single arm 21. The end 29 of the first arm 21 is pivotably connected to a movable pivot point 76 mounted on a movable base 42. The first arm 21 pivots about a pivot point axis 77 extending through the movable pivot point 76. The movable base 42 is movable in a vertical direction and is fixed in a horizontal direction by a guide or rail 43.

A spring 36 is connected to the arm mechanism 14 at a fixed spring connection point 27 at a mechanism end 40 of the spring. The spring is further connected at its upper end 38 to a spring base point 52 mounted on a fixed base 50. During rotation of the first arm 21, the spring pivots about a spring base axis 51 which extends through the spring base point 52. The spring base axis 51 intersects axis 17 and extends parallel to the pivot point axis 77. The spring base axis 51 is also indicated as line 51.

The mass (or object) 12 is connected to the arm at a mass coupling point 200. A force of gravity on the mass is directed along a first direction 71.

An axis 17 extends through the movable pivot point 76 and extends substantially parallel to a direction 71 of the force exerted at the mass coupling point 200. The axis 17 extends transverse to the spring base axis 51. Generally, the axis 17 will extend through the spring base point 52. However, the spring base point 52 may be positioned before or behind the plane of drawing in FIG. 2A. In that case, the axis 17 extends through the spring base axis 51 about which the spring rotates, but not through the spring base point 52 itself. The spring base axis 51 is substantially parallel to the pivot point axis 77 of the movable pivot point 76. In this case, the spring base point 52 is located at a distance from the axis 17, along the line 51 which extends parallel to the pivot point axis 77. The movable pivot point 76 is movable in a direction 46 which is substantially aligned with the axis 17 and substantially aligned with the first direction 71. The arm 21 extends at an angle β to the axis 17.

In use, the position of the movable pivot point 76 can be adjusted to balance the spring force to the weight of the mass 12.

FIG. 2A is schematic. A frame may be provided which interconnects rail 43 and fixed base 50. The movable pivot point 76 is movable relative to said frame and relative to said rail 43.

Figure 2B:
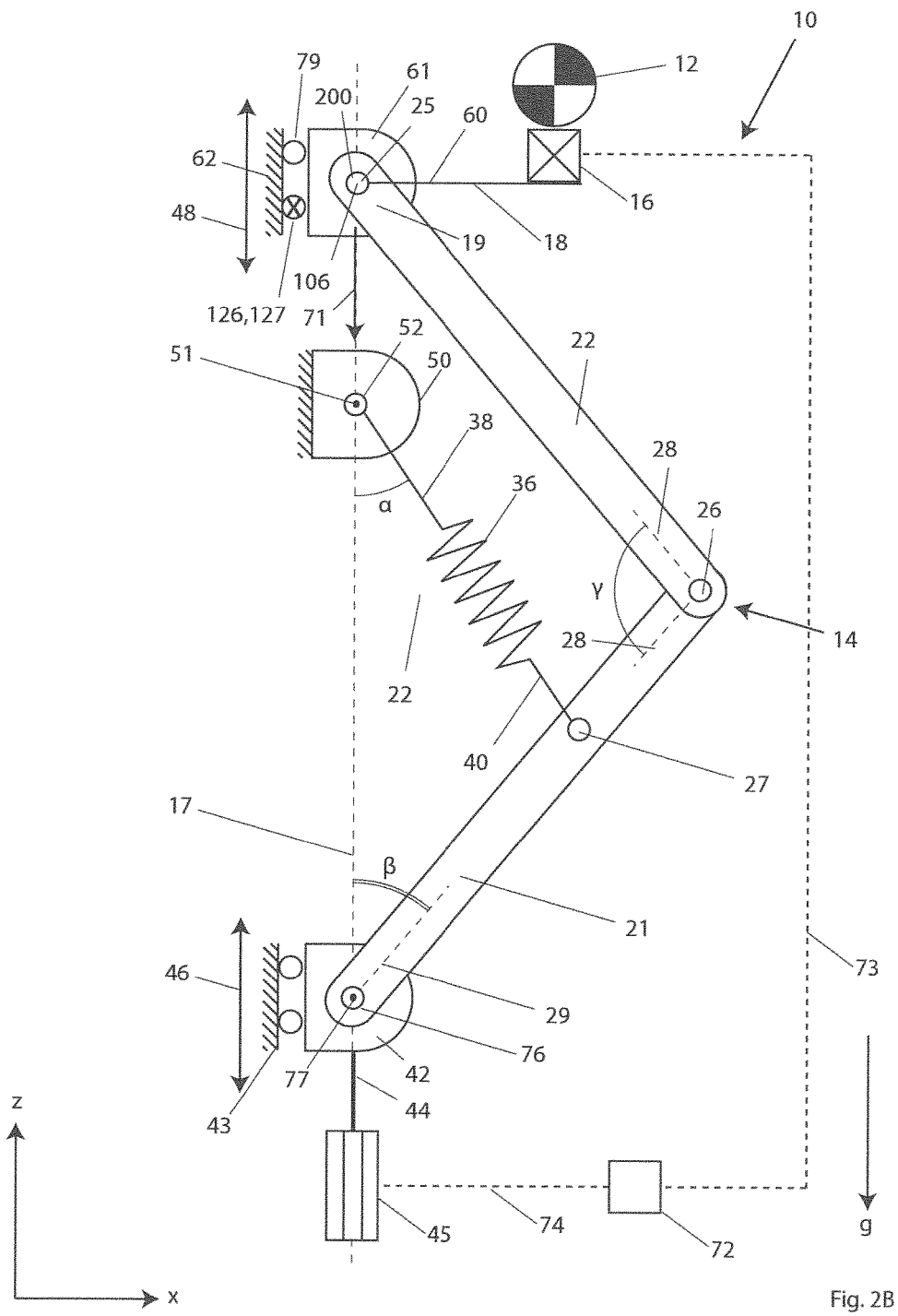
FIG. 2B shows a schematic side view of a second embodiment according to the invention.

Turning to FIG. 2B, an embodiment of the spring balanced support device 10 is shown which supports an object 12. The spring balanced support device comprises an arm mechanism 14. The arm mechanism comprises a first arm 21 and a second arm 22. The arms 21, 22, are interconnected via an elbow pivot connection 26 at their ends 28. The arms 21, 22 extend at an angle gamma (γ) to one another. The arms 21 and 22 will generally be of substantially equal length, and the distance from the elbow point to the axis along both arms will generally be equal.

The spring is connected to the first arm but may be connected to the second arm or to the hinge connection 26 between the two arms. The spring may also be indirectly coupled to the arm mechanism. The spring 36 extends at an angle α to the axis 17. The fixed base 50 is fixed in space. It will be seen in a further embodiment that the spring balanced support device as a whole, including fixed base 50, can be arranged on a frame which is movable in any direction including the horizontal direction.

The movable pivot point 76 is positioned vertically underneath the spring base point 52. The spring base point is located along axis 17, but is not in the way of the second movable pivot point 25. This can be arranged in various manners for instance by placing the spring base point out of the plane of drawing. The second movable pivot point 25 has an operating range and the spring base point 52 is located near, or within the operating range of the second movable pivot point 25. Movable pivot point 25 is movable substantially parallel to the axis. Generally, but not always, movable pivot point 25 is movable substantially along the axis.

At an upper end 19 of the second arm 22, the arm 22 is pivotably connected to a movable support 61 via a (second) movable pivot connection 25. The movable support 61 is a movable carriage which is movable in a vertical direction but fixed in a horizontal direction by a rail 62. A mass support member 18 is connected to the movable support 61, which mass support member supports the object 12. The mass support member 18 comprises an arm 60 which protrudes horizontally. The arm 60 is rigidly coupled to the movable support 61 and the movable support 61 maintains the arm in its working orientation, which in this case is horizontal. The connection between the mass support member 18 and the arm mechanism 14 is referred to as the mass coupling point 200. The movable pivot connection 25 coincides with the mass coupling point 200 and may in practice also coincide with mass support member 18.

The weight force is transferred to the arm mechanism at the mass coupling point 200 and is directed in the direction 71. In FIG. 2B this first direction 71 is vertical.

The mass support member 18 is not coupled to the arm mechanism 14 directly, but via the carriage 61 which is guided by the vertical rail 62. It is the carriage 61 which is connected to the arm mechanism 14. The carriage is held in a fixed orientation by the rail 62, and bending moments resulting from the weight of the object 12 multiplied by the length of the horizontal arm 60 are transferred by the carriage 61 onto the rail 62. The carriage and the rail are constructed to maintain the protruding arm in an operable orientation. Only a short length of rail 62 is indicated, but the skilled person will understand that the rail 62 extends over the whole operating range. The same applies for the rail 43, which extends over the whole adjustment range.

A brake device 126 is provided to lock the movable support 61 at the moment of adjusting the position of movable base 42. The brake device 126 may comprise a first brake member 127 configured to brake the wheels 79 of the movable support 61. The brake device may be coupled to the control device 72.

Each part of the arm mechanism 14 is movable at least in a direction parallel with the axis 17, i.e. there is no part of the arm mechanism which is fixed to the surroundings.

A weighing device 16 is provided between the object 12 and the arm mechanism 14 to weigh the object. The weighing device may also have a different position. An adjusting device 44 comprising an actuator 45 is provided to move the movable base 42 in a vertical direction 46. The actuator may be electric, pneumatic or hydraulic or otherwise. The spring balanced device 10 further comprises a control device 72 which is connected via connection lines 73, 74 to respectively the weighing device 16 and the actuator 45 of the adjustment mechanism. The actuator 45 is also capable of acting as a brake and fixating the position of the movable pivot point 76 during the moving mode in which the device is balancing the mass.

In use, the object is weighed and a signal indicating the weight is sent to the control device via line 73. The control device 72 determines a signal to be sent to the actuator and sends the signal via the line 74. The actuator 44 adjusts the position of the movable base 42. The weighing and adjusting operation can take automatically or semi-automatically. In a short period of time, for instance less than a second, the springs 36, 37 balance the weight of the object 12 and the object may be picked up and placed.

It is noted that when the position of the movable base 42 is adjusted with the adjusting mechanism 44, the position of the mass support member 18 may change in an undesired way. This can be prevented with, for example, the brake device 127.

The mass support member 18 can also comprise a platform which supports the object or a hook which is attached to the object. The mass support member 18 can also have a different form, for instance an eye or still a different form.

In another embodiment, the weighing device 16 has a visual indicator and there is no control device 72. The movable base can be adjusted manually. The adjustment is performed manually by the operator on the basis of the measured weight. It is also possible that no weighing device is present, in case objects of a known weight need to be picked and placed or in case no picking and placing is required, i.e. when an object only needs to be moved, but not frequently coupled to and uncoupled from the mass support member.

Figure 2C:
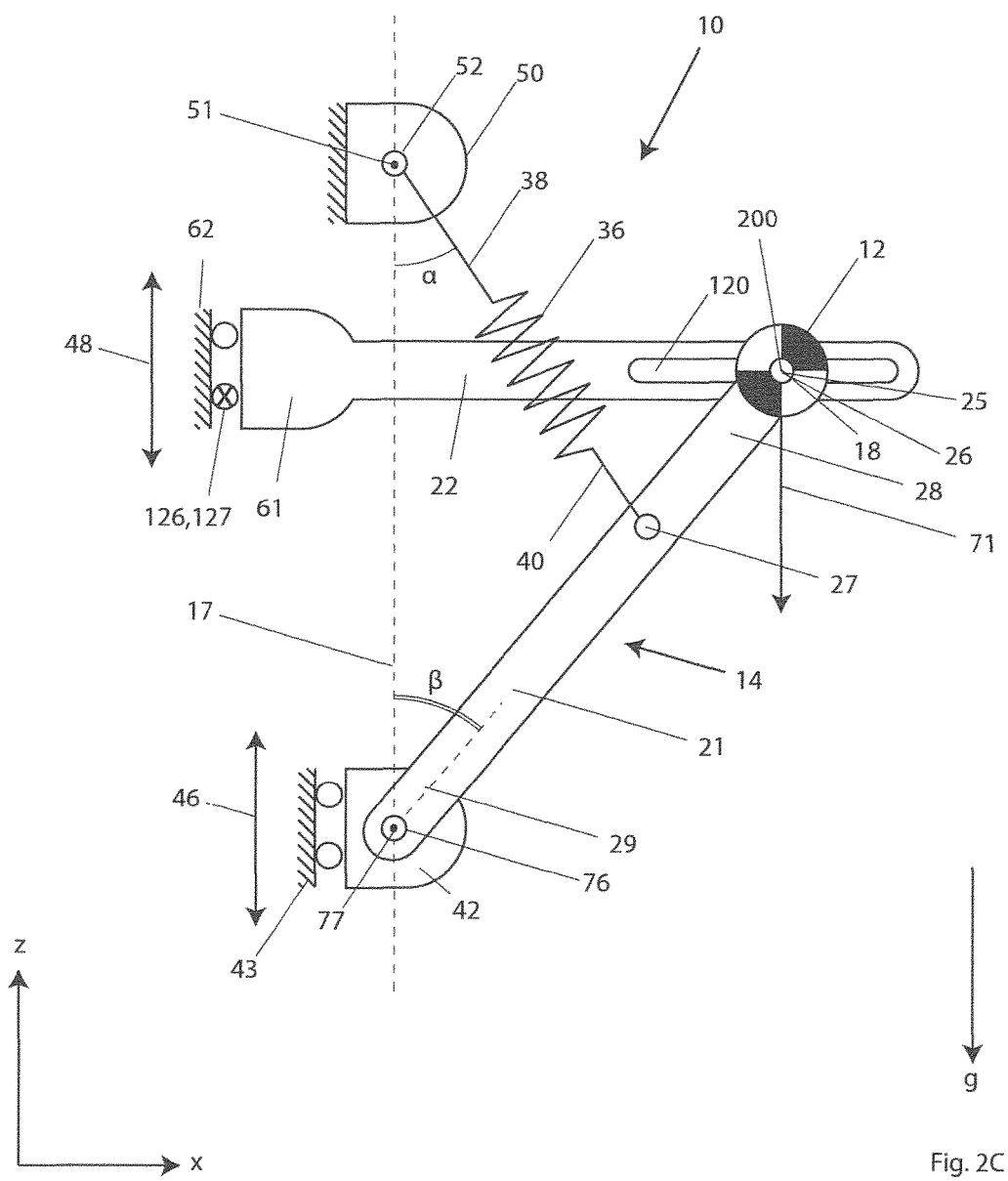
FIG. 2C shows a schematic side view of a third embodiment according to the invention.

Turning to FIG. 2C, an alternative variant is shown in which the second arm 22 is rigidly connected to the movable support 61 and is fixed in a given orientation which may be horizontal, and wherein the first arm 21 and second arm 22 are connected to one another via a sliding slot 120 and a cam which slides through the sliding slot 120. The connection between the first and second arm not only allows a pivoting movement, but also a sliding movement. This embodiment can also be executed with the sliding slot on first arm 21 instead of the second arm 22.

Figure 2D:
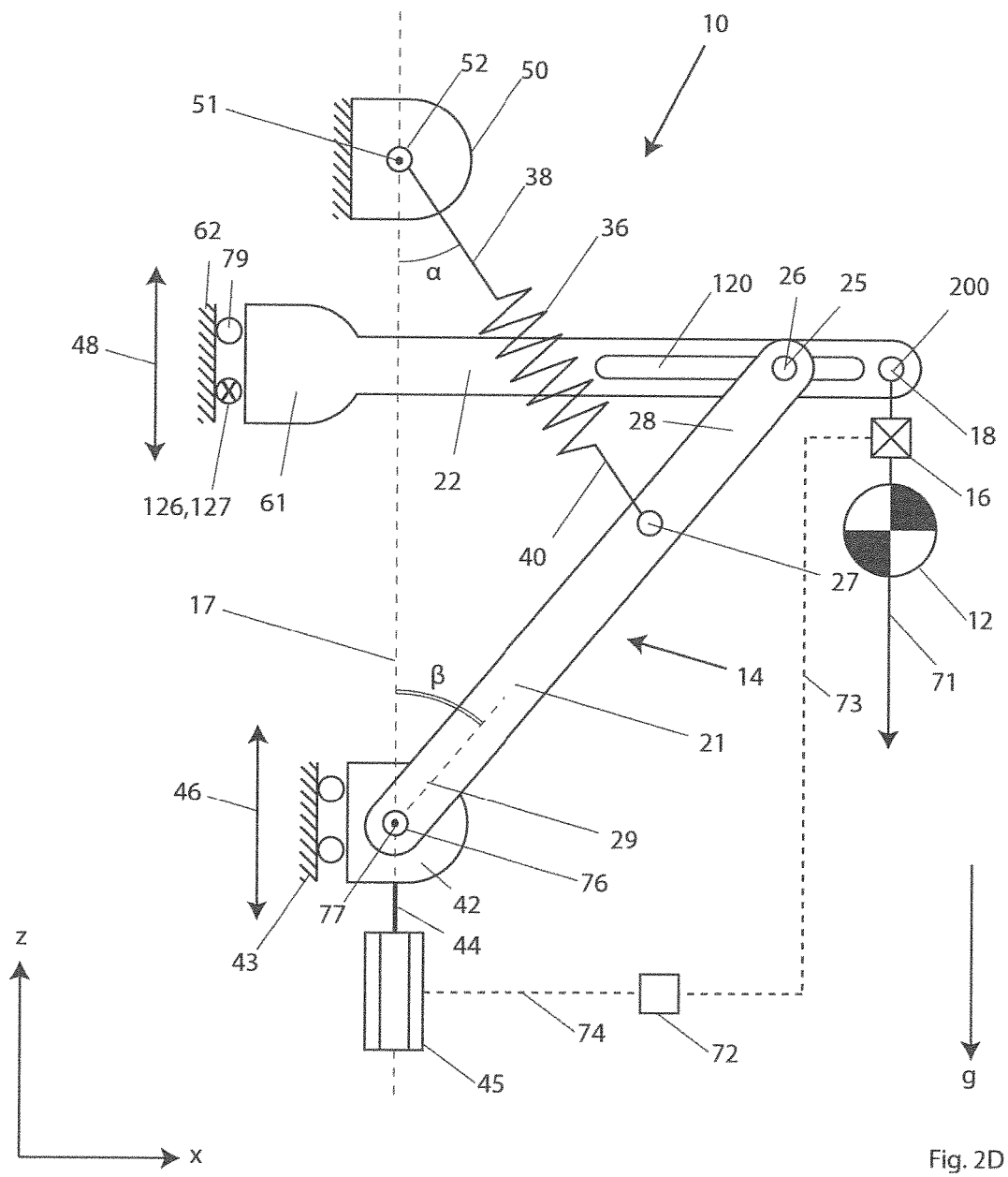
FIG. 2D shows a schematic side view of a fourth embodiment according to the invention.
Figure 3A:
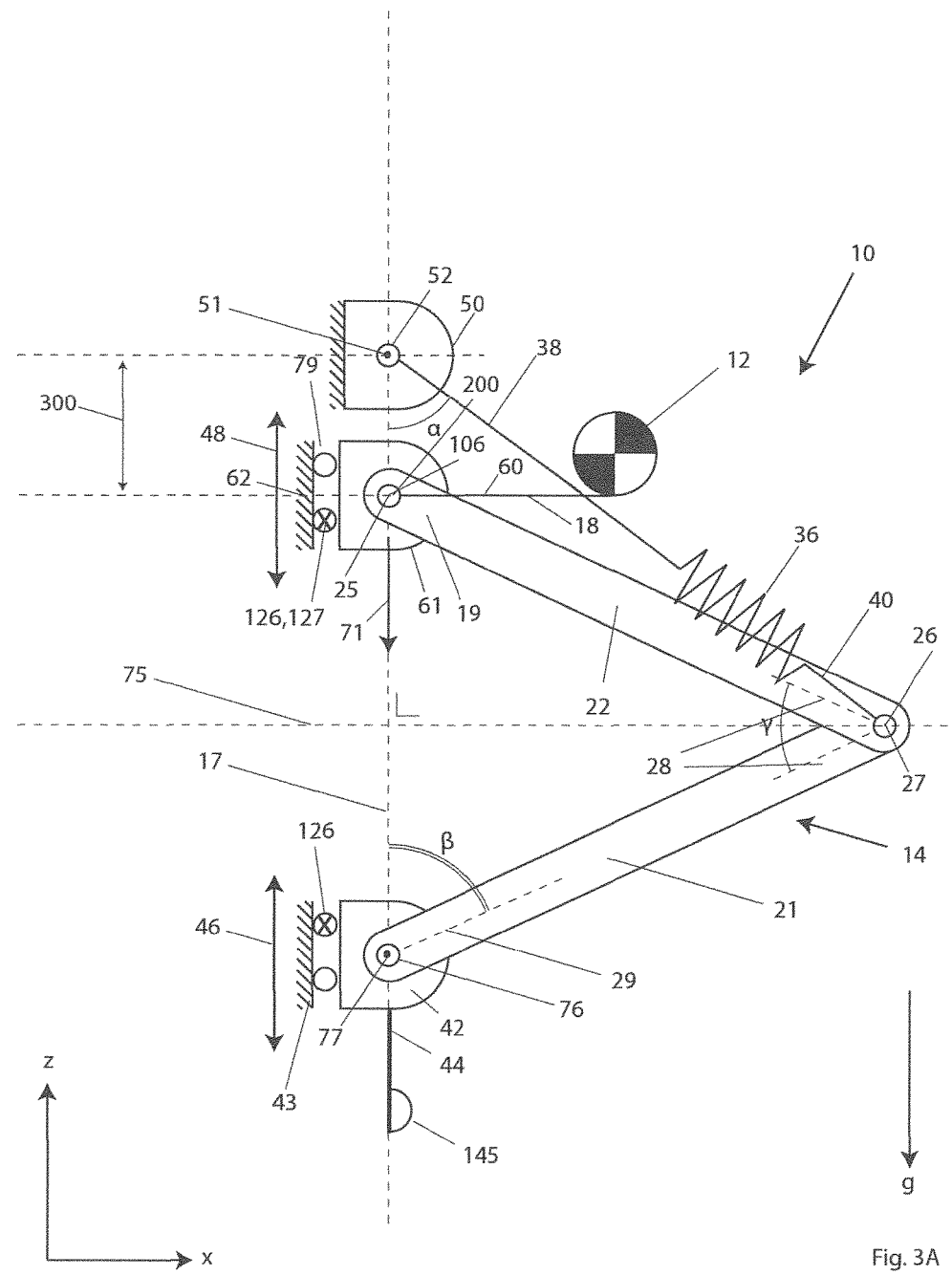
FIG. 3A shows a schematic side view of a fifth embodiment according to the invention.
Figure 3B:
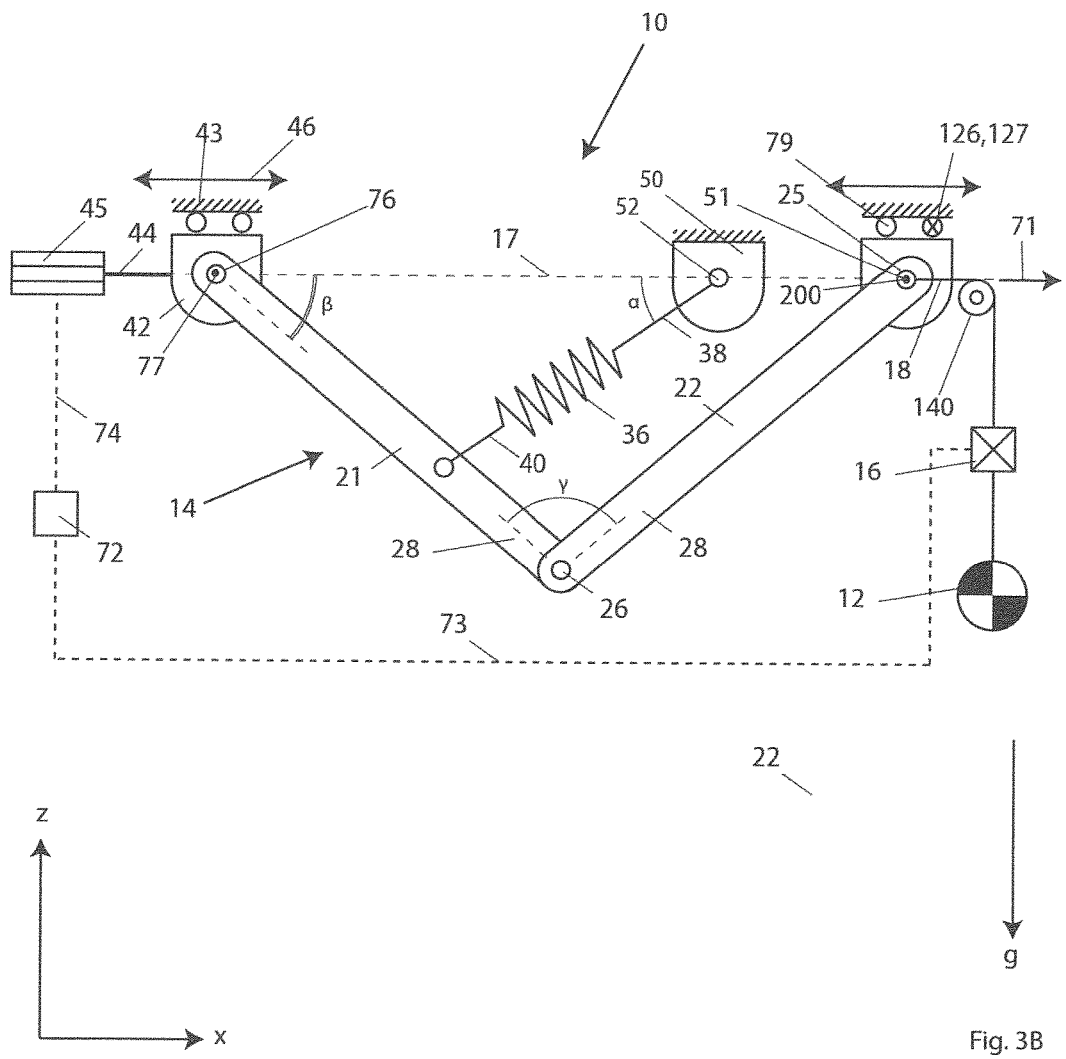
FIG. 3B shows a schematic side view of a sixth embodiment according to the invention.
Figure 3C:
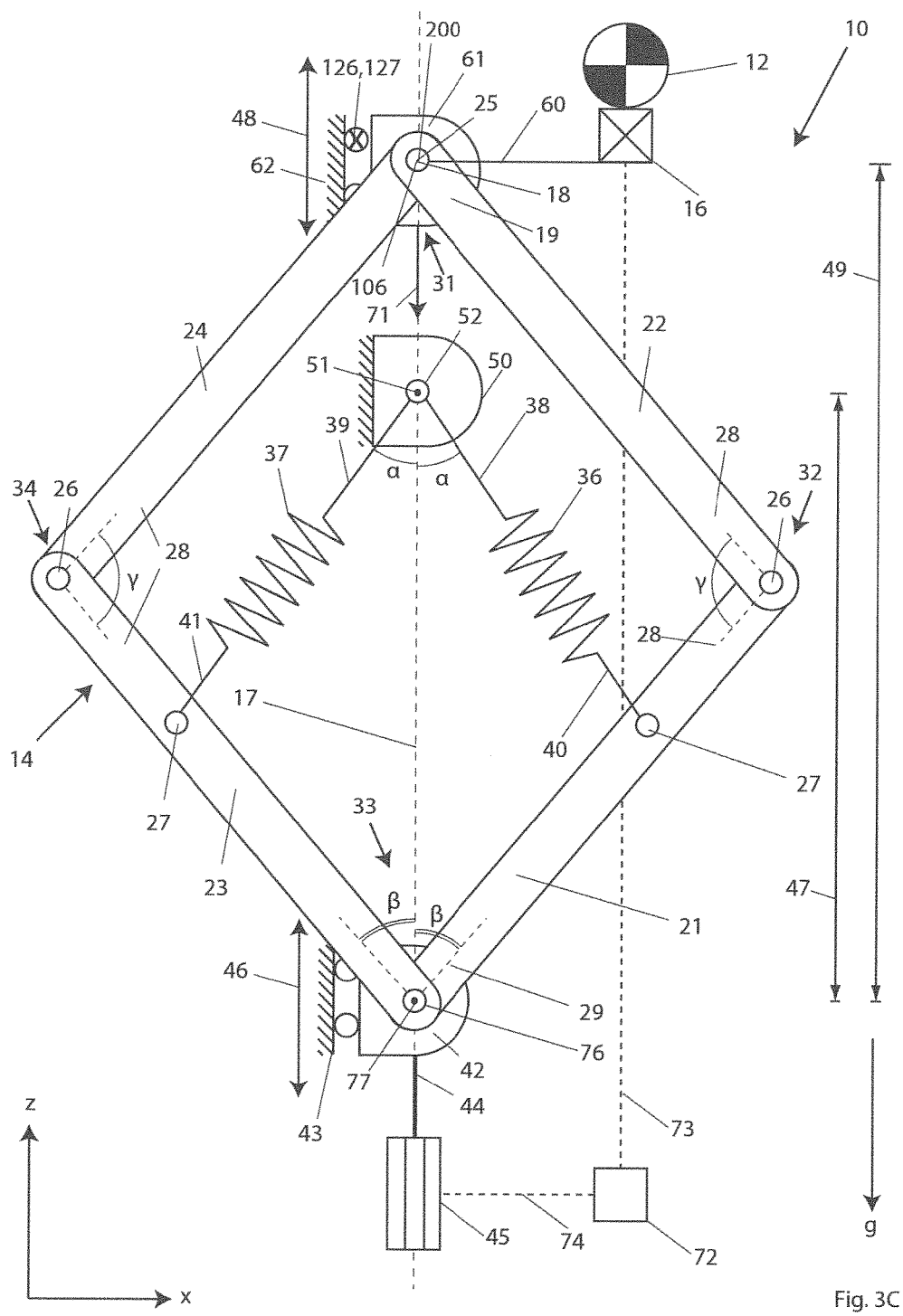
FIG. 3C shows a schematic side view of a seventh embodiment according to the invention.

Turning to FIG. 2D, the variant of FIG. 3C is shown including a control device 72 which is connected to a weighing device 16 and an adjustment device 44 having an actuator. This allows automatic adjustment. In this embodiment the mass is coupled to the second arm, which has the benefit it does not move in a direction transverse to the axis 17.

Turning to FIG. 3A, the embodiment of FIG. 2B is shown, but having a hand grip 145 instead of a control device 72. The hand grip 145 may also be provided in addition to the control device 72.

The arm mechanism 14 has its elbow pivot point 26 located substantially on the same position as the spring connection point 27. Points 25, 76 and 52 are all located substantially on the axis 17 (when viewed in a direction parallel to the pivot point axis 77). The elbow pivot point 26 is located at a same distance from the two movable pivot points 25 and 76. The movable pivots points 76, 25 have their operating ranges chosen such that point 25 can be positioned near or at the position of point 52. Generally, point 76 will be on the same side of point 52 on the axis as point 25. In addition to being movable substantially along the axis, the two movable pivot points 25 and 76 are also enabled to be maintained at a certain position along said axis.

In this configuration the arm mechanism may be regarded as reversible, or direction invariant as seen from one direction on the axis 17 or the other. An arm mechanism 14 in this configuration can be regarded as mirrored in line 75 which extends through elbow pivot point 26, transverse to the axis 17. Both the first pivot point 76 and the second movable pivot point 25 can be moved along the axis:

During adjusting mode, the second movable pivot point 25 is held in position and named "passive", while the first movable pivot point 76 is being able to move for adjustment, and named "active".

During balancing mode, this is reversed, i.e. the second movable pivot point 25 is moved and named active, being actively balanced, while the first movable pivot point 76 is stationary and named "passive".

The second movable pivot connection 25 is positioned near the level of the spring base point 52, at a certain distance (300). It is noted that the second movable pivot connection 25 is positioned slightly below the spring base point 52. This offset compensates for the mass of the arm mechanism 14 itself. The distance 300 between the second movable pivot point 25 and the spring base point 52 depends on the weight of the arm mechanism 14. Distance 300 is the referred to as the "phantomspring" distance, when the moment generated by the spring 36 around pivot point 25 only changes in order to compensate for a change in potential energy of the arm mechanism itself during adjusting mode. This implies that the adjusting process can be carried out with very little force or without any force, and is referred to as zero force adjusting. This provides a substantial advantage.

Maintaining pivot points 25 and 76 at their respective required positions can be executed in various ways, among others using a brake 126, and/or by adjusting the spring balanced support device 10 very quickly or substantially instantly at the moment at which the weight of the mass 12 exerted on the spring balanced support device 10 changes.

Adjustment by translating pivot point 76 may also be executed in various ways, such as manually, passively mechanical (for instance by using a second spring), or actively mechanical for instance by using a motor or actuator 45. Such a motor or actuator can also function as a lock so a separate brake 126 may not be necessary.

Enabling zero force adjustment in such a relatively simple embodiment has several advantages compared to known spring balanced support devices.

Turning to FIG. 3B, an embodiment is shown which is similar to the embodiment of FIG. 2B, but wherein the axis 17 is rotated over 90 degrees and extends horizontally. The mass is suspended from member 18, which is a cable guided over pulley 140.

The figure shows the spring balanced support device can be mounted in any conceivable orientation. The direction of gravity does not need to be parallel to the axis 17. The skilled person will understand that the axis 17 and the first direction 71 can also be oriented at a different angle, as long as they are substantially parallel. The embodiment of FIG. 3B does not work completely the same as the embodiment of FIG. 2B, because the weights of the components of the arm mechanism 14 itself are not aligned with the axis 17, which results in a slight deviation.

In this figure the direction of gravity is square/transverse to the axis. However, by use of a pulley 140, the direction of the force of gravity on the mass exerted on the spring balanced support device in second movable pivot point 25 is aligned with the axis 17. For accurate balancing, the direction of the force exerted on the spring balanced support device by the gravity force on the mass needs to be substantially parallel to the direction of the axis 17 extending through the spring base point 52.

At certain angles of the axis 17 to the direction of gravity, the spring balanced support device needs to be properly designed to compensate for different gravity forces on the arm mechanism itself. In some cases it is preferred to rotate the arm mechanism 14 to an orientation wherein the arm mechanism is moving substantially in a horizontal plane.

Turning to FIG. 3C, another embodiment of the spring balanced support device 10 is shown.

The figure shows a spring balanced support device according to the invention where the arm mechanism from the preceding FIGS. 2B, 3A and 3B) is executed twice, mirrored in the axis 17. In this embodiment, the forces from the left upper and lower arms 23 and 24 in pivot points 76 and 25 are cancelled out by opposite forces from the right arm parts 21 and 22. This embodiment has substantially the same benefits as the embodiments as shown in the said preceding figures. It has two additional benefits: rails 43 and 62 can be constructed very lightly because forces in the x-axis are limited, and the balanced movement of pivot point 25 need not be limited to movement along axis 17. In other words: pivot point 25 does not need to be restricted for movement substantially along attached to rail 62 but may also move away from axis 17 and toward axis 17.

The spring balanced support device 10 comprises an arm mechanism 14. The arm mechanism comprises a first arm 21, a second arm 22, a third arm 23 and a fourth arm 24. The four arms 21, 22, 23, 24 are interconnected via pivot connections 26, 76, 25 at their ends 19, 28, 29. The four arms form a parallelogram configuration having four corners, i.e. an upper corner 31, a right corner 32, a lower corner 33 and a left corner 34. If the axis has a different orientation, the words "upper" and "lower" do not apply, but they are used here for reasons of simplicity.

The left and right pivot connections 26 are also indicated as the elbow joints 26. The right and left corners 32, 34 are also indicated as the elbows. The first arm is also indicated as the lower right arm 21, the second arm is also indicated as the upper right arm 22, the third arm is also indicated as the lower left arm 23 and the fourth arm is also indicated as the upper right arm 24.

A mass support member 18 in the form of an arm is provided which supports the object 12.

The spring balanced support device comprises a first spring 36 and a second spring 37. The springs 36, 37 extend at an angle 2*α to one another. The first and second spring are connected at their upper ends 38 resp. 39 to a spring base point 52 in the form of a fixed base 50. It will be seen in FIG. 4B that the springs may also be guided around the spring base point 52 to a fixed base 50 which is provided underneath the spring base point 52 and be connected to said fixed base with their lower ends. The springs 36, 37 exert an upward force on the arm mechanism. The fixed base 50 is fixed in space. It will be seen with respect to FIG. 4A that the fixed base 50 can be arranged on a frame 84 which is movable in a horizontal direction. Therefore, "fixed base" in this respect should be interpreted purposively and does not exclude horizontal or vertical movements of the spring balanced support device as a whole. The first movable pivot point 76 is positioned vertically underneath the spring base point 52.

The opposite ends 40, 41 of the springs are connected to the arm mechanism 14 at respective spring connection points 27 which are located on the first and third arms 21, 23. The springs may also be connected to the elbows. It is also possible that the respective springs 36, 37 are connected to the respective first arm 21 and third arm 23 at a different position along the length of said arms.

A weighing device 16 is provided between the object 12 and the arm mechanism 14 to weigh the object. The weighing device may also have a different position.

The first movable pivot point 76 is provided at the bottom corner 33. The ends 29 of the right arm 21 and left arm 23 are pivotably connected to one another and pivotably connected to the movable base 42. The movable base 42 may be guided along a rail 43 which extends vertically. The rail 43 allows a vertical movement of the movable base 42 but not a horizontal movement of the movable base 42. An adjusting device 44 comprising an actuator 45 is provided to move the movable base in a vertical direction.

A vertical axis 17 is defined which extends through the fixed base 50 and the movable base 42. The vertical axis may also extend through the upper corner 31. The fixed base 50 and the movable base 42 are located at a base distance 47 from one another. The adjusting device 44 is constructed to change the base distance 47. The upper corner 31 and lower corner 33 are located at an arm distance 49 from one another.

The upper corner 31 may also be guided along a vertical rail 62 in order to prevent any horizontal movement of the upper corner 31 and of the mass support member 18.

The right upper arm 22 and the right lower arm 21 make an angle γ with one another. Likewise, the left upper arm 24 and the left lower arm 23 make an angle γ with one another.

The arm mechanism 14 has the feature that when the mass support member 18 is moved downward, the spring connection points 27 are forced outwardly away from each other, and a distance 59 (shown in the right side in FIG. 3) between the spring connection points 27 and the spring base point 52 is increased. This results in an increase in the spring force F.

As in the devices of the prior art, it can be found that as long as the axis 17 which is defined by the spring base point 52 and the pivot point 76 of the movable base extends parallel to the direction 71 of the weight force on the arm mechanism, the moments of the load 12 and the springs 36, 37 about the movable pivot point 25 of the movable base vary with sin β, allowing a perfect equilibrium, i.e. a spring balanced mechanism.

In operation, an object 12 is suspended from the mass support member 18. The object is weighed with the weighing device 16. The adjusting device 44 is operated to move the movable base 42 in a vertical direction, see arrow 46. By moving the lower corner 33 in a vertical direction, the springs 36, 37 are either extended or shortened. A spring force F varies with the lengthening or shortening of the springs 36, 37.

In this way, the weight of the object 12 can be balanced by the combined spring force F of the springs 36, 37. In other words, the vertical components of the forces exerted by the two upper arms 22, 24 on the movable pivot point 25 of the upper corner 31 counteract the weight of the object 12 when the moveable base 42 is in the correct position. It is noted that by extending or shortening the springs, a certain amount of energy is brought into the system or released from the system. When the second movable pivot point 25 is located near the spring base point 52, the adjustment can be carried out with little or no force. In this way, the amount of energy in the system stays substantially the same during the adjustment process.

In practice, use can be made of this feature when it is possible to have a fixed location where the objects are engaged with the spring balanced support device. For instance, when objects have to be picked up from a same platform or belt conveyor each time, the spring balanced support device can be configured such that when the object support member is in the engagement location, the second movable pivot point 25 is near the spring base point 52, at its phantomspring distance, where the adjustment can be done with zero force. The same concepts as mentioned in the description of FIG. 3A apply Once the weight of the object is balanced, the object can be moved manually in a vertical direction with very little force. Even a relatively heavy object can be moved with little force. During the movement of the object 12, the position of the movable base 42 is held stationary, i.e. the position of the movable base 42 is only moved during the process of adjusting the spring balanced support device to a new weight.

Since the movable pivot point 76 is adjustable, the spring balanced support device can be adjusted to varying weights. The range of weights that can be handled has an upper limit and a lower limit. The upper limit and lower limits can be varied according to prevailing conditions in the field of use. When the object is attached to the mass support member 18, the weighing process starts. When the weight is determined, the adjustment device 44 is adjusted to the measured weight. This can be done by hand or automatically. Next, a pick and place operation in a vertical direction can be carried out on the object. The vertical movement is indicated by arrow 48.

It is also possible that the weight of the objects is known in advance. In such a case, the spring balanced support device may be carried out without a weighing device. The adjustment device 44 is then adjusted to the known weight without weighing the objects. Examples are standard size bricks or stones of which the weight is known, or standard size cement bags, etc.

Figure 3D:
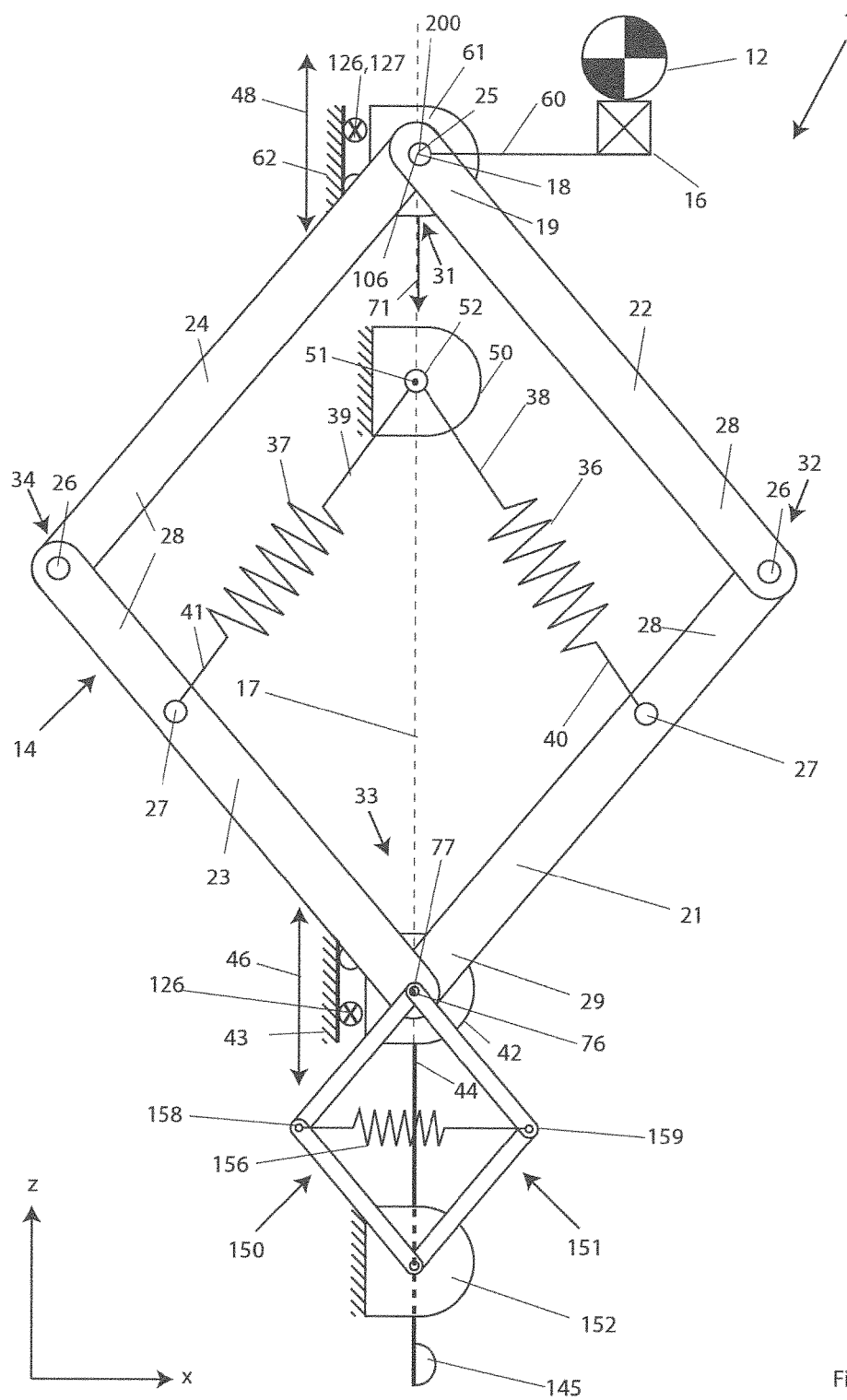
FIG. 3D shows a schematic side view of an eighth embodiment according to the invention.

Turning to FIG. 3D, an embodiment is shown having a manual adjusting device 145. The adjusting device has the form of a hand grip. With the hand grip, the operator can simply move the movable base 42 up or down. The manual adjusting device 44 is coupled to the movable pivot point 76 via a "zero force device" 150. The zero force device comprises a second arm mechanism 151 which is may be in the form of a four arm diamond configuration. A lower corner 154 of the second arm mechanism 151 is connected to a fixed base 152. The hand grip is not connected to fixed base but only to the movable base 42. A spring 156 is connected within the second arm mechanism. The spring 156 extends between the left elbow 158 and right elbow 159.

The adjusting device comprises a hand grip 145. With the hand grip, the operator can simply move the movable base 42 up or down. The hand grip 145 is connected to the movable base 142 via a rod. When the movable base 42 is moved downwards, springs 36, 37 shorten, which releases energy and therefore provides a force. At the same time, spring 156 extends, which costs energy, and therefore requires a force. The forces may cancel each other out so that the adjusting process does not require any force.

Figure 3E:
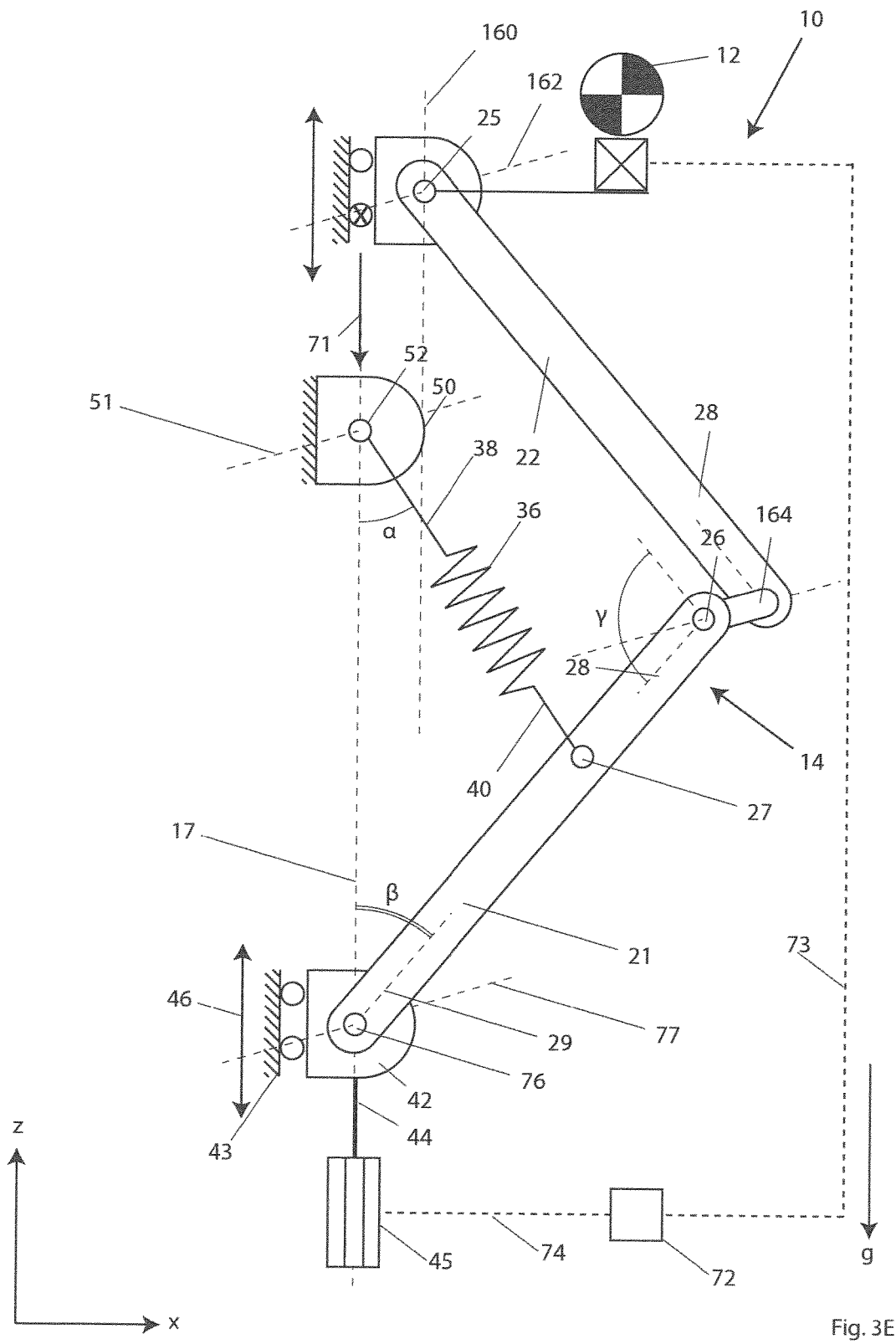
FIG. 3E shows a schematic isometric view of a ninth embodiment according to the invention.

Turning to FIG. 3E, the pivot point axis 77 and the axis 51 through the spring base point 52 are shown. In this embodiment, the second movable pivot point moves along an axis 160 which is not aligned with the axis 17 but located at a distance from said axis 17. The arm 22 pivots about axis 162 extending through the second movable pivot point 25. The arm 22 is located at a distance from arm 21 by a spacer element 164.

This embodiment allows the second movable pivot point 25 and the spring base point to pass one another.

In another embodiment, the spring base point 52 may be located at a distance from axis 17 along the line 51. In that case, the axis 160 can be aligned with axis 17 and the second movable pivot point 25 and the spring base point 52 would still be able to pass one another.

Figure 4A:
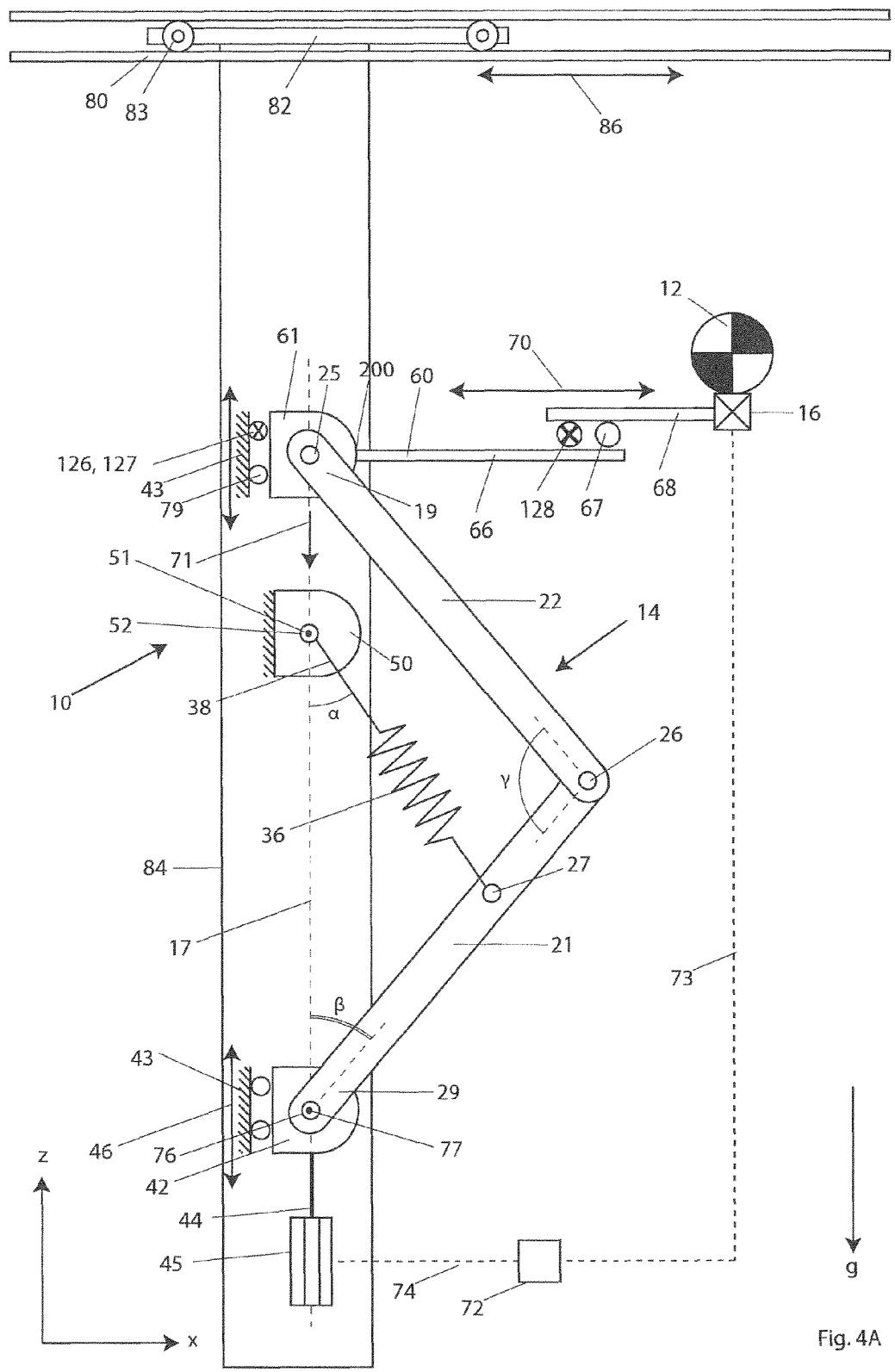
FIG. 4A shows a schematic side view of a tenth embodiment according to the invention.

Turning to FIG. 4A a further embodiment is shown. The spring balanced support device 10 comprises an overhead rail 80 and a wagon 82 which comprises wheels 83 and is movable in a horizontal direction 86 along said rail 80. An upper rail 80 and a lower rail 80 are provided to fixate the wagon between the rails 80. A vertical frame 84 or vertical arm 84 is suspended from the wagon 82 and fixed to said wagon. Moments from the frame 84 can be transferred to the rail 80 via the wagon 82.

The embodiment has two arms 21, 22, i.e. a lower arm 21 and an upper arm 22. The embodiment has a single elbow and a single spring 36. It is noted that the single spring 36 may be replaced by two or more springs, for instance parallel springs, if needed. It is also possible to distribute the force of a single spring over a left side and a right side of an arm mechanism.

A rail 43 is provided which extends vertically and guides both the movable base 42 and the mass coupling point 200 at the end 19 of the upper arm 22. The upper end 28 of the upper arm 22 is held in a fixed horizontal position by the rail 43.

The horizontal arm 60 comprises a first segment 66 and a second segment 68 which are slideably arranged relative to one another via a sliding or rolling mechanism 67. This configuration allows a horizontal movement of the object which is indicated by arrow 70. The horizontal movement and the vertical movement together allow a movement in two dimensions with little effort. The mass support member 18 is a platform on which the object 12 may rest.

The carriage 61 further comprises a hinge 110 having a vertical axis 112. The hinge 110 allows rotation of the horizontal arm 60 about the vertical axis 112, thereby allowing a movement of the object 12 in three dimensions.

Figure 4B:
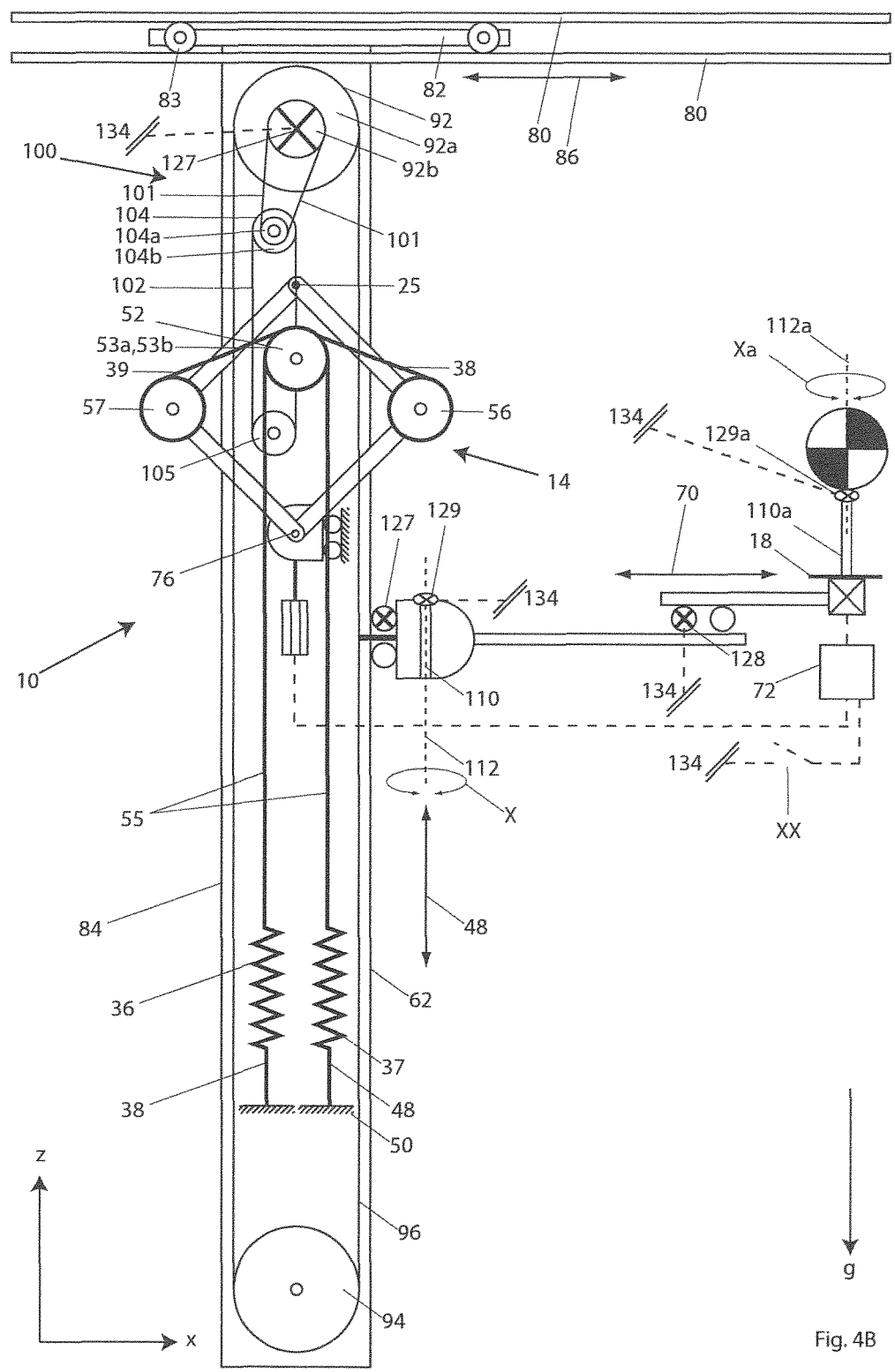
FIG. 4B shows a schematic side view of another embodiment according to the invention.

Turning to FIG. 4B, another embodiment is shown. The arm mechanism 14 comprises four arms 21, 22, 23, 24. The frame 84 houses the arm mechanism 14. The springs 36 and 37 are located below the arm mechanism. The fixed base 50 is located below the arm mechanism 14. This allows the arm mechanism 14 to be placed relatively high up in the spring balanced support device, above an area where an operator is located. Furthermore, this configuration allows longer lengths of the springs which results in a more constant spring force over the operating range.

A spring base point 52 in the form of two pulleys 53A, 53B is located above the elbows 32, 34. The springs 36, 37 extend from the fixed base 50 to the spring base point 52 and from the spring base point 52 to the right and left elbows 32, 34. It is noted that the spring 36 may end below the spring base point 52, but a spring cable 55 continues from the point onward. One spring cable 55 is guided over pulley 53A and one spring cable 55 is guided over pulley 53B. The pulleys 53A, 53B are rotatable. The movable base 42 is positioned vertically underneath the spring base point 52, i.e. along a same vertical axis 17. The spring cables 55 cross one another at the spring support, i.e. the left spring 36 is connected to the right arm 21 and the right spring 37 is connected to the left arm 23.

The elbows are also provided as pulleys 56, 57 which are fixed to the respective lower arms 22, 24. The pulleys 56, 57 act as curved support surfaces and allow the ends 38, 39 of the springs to engage the elbows 32, 34 without excessive local bending moments in the ends 38, 39 of the springs.

The carriage 61 is guided by the vertical rail 62 and is not connected directly to the arm mechanism 14. Instead, the carriage 61 is connected to a pulley device 90 which in turn is connected to the arm mechanism 14 via a transmission 100. The pulley device 90 comprises an upper pulley 92, a lower pulley 94 and a cable 96. The carriage 61 is fixed to the cable 96.

The upper pulley 92 comprises a large pulley wheel 92A and a small pulley wheel 92B. The cable 96 is guided over the large pulley wheel 92A. The small pulley wheel 92B is connected to the transmission device 100 via a cable 101. The cable 92 is connected to a pulley 104 of the transmission device. The pulley 104 comprises two pulley wheels 104A, 104B. The pulley wheel 104B is connected via another cable 102 to a second pulley 105 of the transmission device. The cable 102 is connected to the upper corner 31 of the arm mechanism 14. This is where the mass coupling point 200 and the upper movable pivot point 25 are located.

This embodiment achieves a relatively large operating range of the mass support member 18 because a large vertical movement 48 of the mass support member 18 is transferred into a relatively small vertical movement of the upper corner 31 of the arm mechanism 14.

The spring balanced support device further comprises a brake member 127 which brakes the upper pulley 92. The brake device 126 further comprises a brake member 128 for the arm 60. The brake member 128 comprises a shoe which brakes the sliding or rolling mechanism 67 in order to fixate the segments 66, 68 relative to one another. The brake members 127, 128 are operated with respective actuators 131, 133 which are coupled to the control device 72 via connection lines 134, 135.

The segmented horizontal arm 60 allows small horizontal movements, see arrow 70. The wagon 82 allows large horizontal movements along the rail 80, see arrow 86.

The brake device 126 comprises a further brake member 129 which brakes the hinge 110 having a vertical hinge axis 112 and a further brake member 129a which brakes the hinge 110a having a vertical hinge axis 112a. Therefore, the brake 126 brakes one or more of the following four different movements:

1) brake member 127 for braking the vertical movement of movable support 61,
2) brake member 128 for braking the horizontal movement of segment 68 relative to segment 66, and
3) brake member 129 for braking the pivoting movement of arm 60 about pivot axis 112.
4) brake member 129a for braking the pivoting movement about axis 112a of the mass 12 on platform 18.

All four brakes members may be connected to the control device 72 via communication lines 134. Only the brake member 127 on the movable support 61 is required for adjusting the movable pivot point 76. The other three brake members 128, 129 and 129a make the spring balanced support device more practical in its operation. The brake member 127 can be released when the adjusting process is finished. The brake members 128, 129 and 129a can be released earlier than the brake member 127. The four brake members can be used in other embodiments as well. The brake members may also be operated manually or triggered by a switch 136 which may be connected to control unit 72.

In operation, the object 12 is placed on the platform 18. The brake device 126 is turned on in order to fixate the vertical position of the mass support member 18 and the object 12. The sliding or rolling mechanism 67 is also fixated. The weight is measured and the movable base 42 is adjusted in order to balance the weight. This only takes a relatively short period of time for most objects. The object can then be moved in a horizontal direction and a vertical direction. When the object 12 is moved upwards, the cable 96 rotates the pulley 92.

The pulley 92 rotates the cable 101 which in turn rotates the pulley 104. The pulley 104 rotates the cable 102 which moves the upper corner 31 of the arm mechanism 14 up or down.

The skilled person will understand that the horizontal arm 60 and the vertical arm 84 need not be oriented exactly horizontally or vertically, but may be oriented at a slight angle.

The embodiment of FIG. 4A having two arms can be combined with many of the features of the embodiment of FIG. 4B, such as the pulley device 90, the transmission device 100, the spring base point 52 in the form of a pulley, the pulley 56 at the elbow and/or the brake device 126 comprising the brake members 127, 128, 129.

In another embodiment, the weighing device comprises an accelerometer. The accelerometer allows the weighing operation to take place in motion, i.e. without the brake device 126 being activated. Accelerometers are known in the field of the art.

Turning to FIGS. 5A and 5B, an embodiment is shown which is based on the embodiment of FIGS. 4A, 4B. The wagon 82 comprises wheels 83 which are supported by a rail 80 which is not shown. The frame 84 extends downwards from the wagon. A housing 85 is provided to cover the frame 84 and the parts of the spring balanced support device. The arm mechanism 14 is provided inside the housing 85, near an upper end thereof and inside an upper part of the housing which is wider than a lower part of the housing.

The protruding arm 60 is rotatable about the hinge 110 to provide full 3D movement of the mass support member 18. The mass support member 18 is a platform, in particular a circular disc. The protruding arm 60 is a telescoping arm comprising two segments 66, 68. Segment 68 telescopes inside segment 66.

The spring balanced support device 10 is positioned at a transport conveyor 118 for suitcases. An operator 120 stand adjacent the transport conveyor and pulls a suitcase from the transport conveyor onto the mass support member 18. The brake device 126 is activated to fix the vertical position. Additionally, the pivoting movement of arm 60 at hinge 110 and the telescoping movement of arm 60 may be fixated by the brake. Next, the weighing device 16 weighs the suitcase and adjusts the movable base 42 via the control device and the actuator. The brake device 126 is subsequently deactivated. The operator can then simply lift the suitcase in any direction he wants, for instance onto a container or wagon 122 holding many suitcases. A movement in a reversed direction is also possible of course, i.e. the operator can load the suitcases from the container or wagon 122 onto the transport conveyor 118. Because the operator needs very little force, the working environment is substantially improved.

It will be clear to the skilled person that the spring balanced support device according to the invention may be free of any motor for moving the object in a horizontal direction or vertical direction, the spring balanced support device allowing the movement in a horizontal and vertical direction by manual labour and therefore more intuitive operation only.

An overhead rail 80 and a wagon 82 which comprises wheels 83 and is movable in a horizontal direction 86 along said rail 80. An upper rail 80 and a lower rail 80 are provided to fixate the wagon between the rails 80. A vertical frame 84 or vertical arm 84 is suspended from the wagon 82 and fixed to said wagon. Moments from the frame 84 can be transferred to the rail 80 via the wagon 82.

The embodiment has two arms 21, 22, i.e. a lower arm 21 and an upper arm 22. The embodiment has a single elbow and a single spring 36. It is noted that the single spring 36 may be replaced by two or more springs, for instance parallel springs, if needed. It is also possible to distribute the force of a single spring over a left side and a right side of an arm mechanism.

A rail 43 is provided which extends vertically and guides both the movable base 42 and the mass coupling point 200 at the end 19 of the upper arm 22. The upper end 28 of the upper arm 22 is held in a fixed horizontal position by the rail 43.

The horizontal arm 60 comprises a first segment 66 and a second segment 68 which are slideably arranged relative to one another via a sliding or rolling mechanism 67. This configuration allows a horizontal movement of the object which is indicated by arrow 70. The horizontal movement and the vertical movement together allow a movement in two dimensions with little effort. The mass support member 18 is a platform on which the object 12 may rest.

The carriage 61 further comprises a hinge 110 having a vertical axis 112. The hinge 110 allows rotation of the horizontal arm 60 about the vertical axis 112, thereby allowing a movement of the object 12 in three dimensions.

Figure 6A:
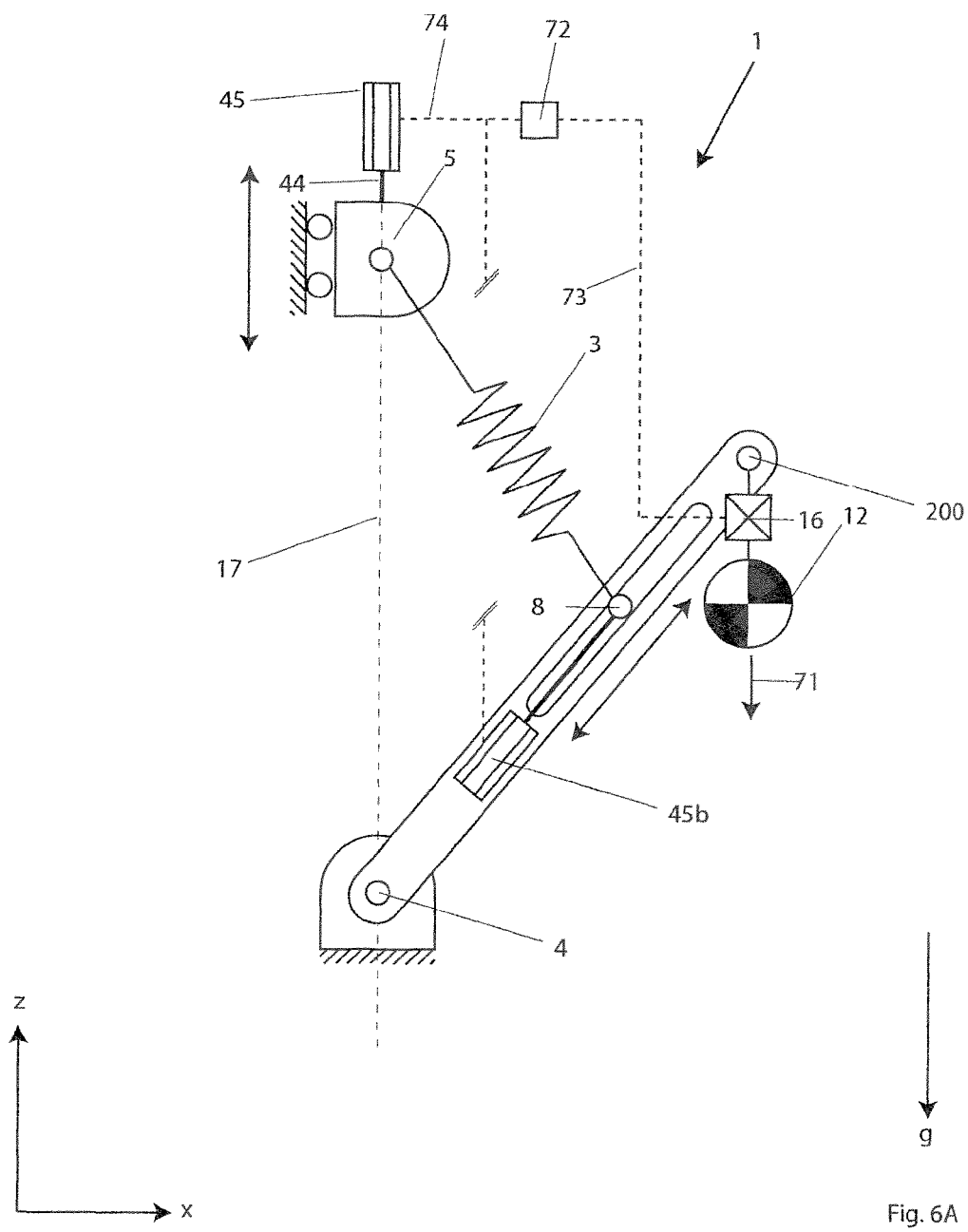
FIG. 6A shows a schematic side view of an embodiment according to a further aspect of the invention.

Turning to FIG. 6A, it is shown that one aspect of the invention can be regarded independently and can be applied in any kind of spring balanced support device. This relates to the combination of weighing device, control device and adjusting mechanism.

FIG. 6A shows a spring balanced support device 1 according to the prior art, i.e. as shown in FIG. 1, but further comprising the combination of a weighing device 16, a control unit 72 and an adjusting mechanism 44 comprising an actuator 45. The actuator is coupled to the base 5 for adjusting the spring 3. With this embodiment, a rapid adjustment of the spring balanced support device to a variable weight is also possible, allowing pick and place operations. The embodiment of FIG. 9 provides a substantial improvement over the prior art. The weighing device 16 can be provided with a accelerometer if required. Alternatively or in combination with the actuator which is coupled to the base 5, an actuator 45*b* may be provided on the arm which is coupled to the slider 8. A brake device may also be provided.

Figure 6B:
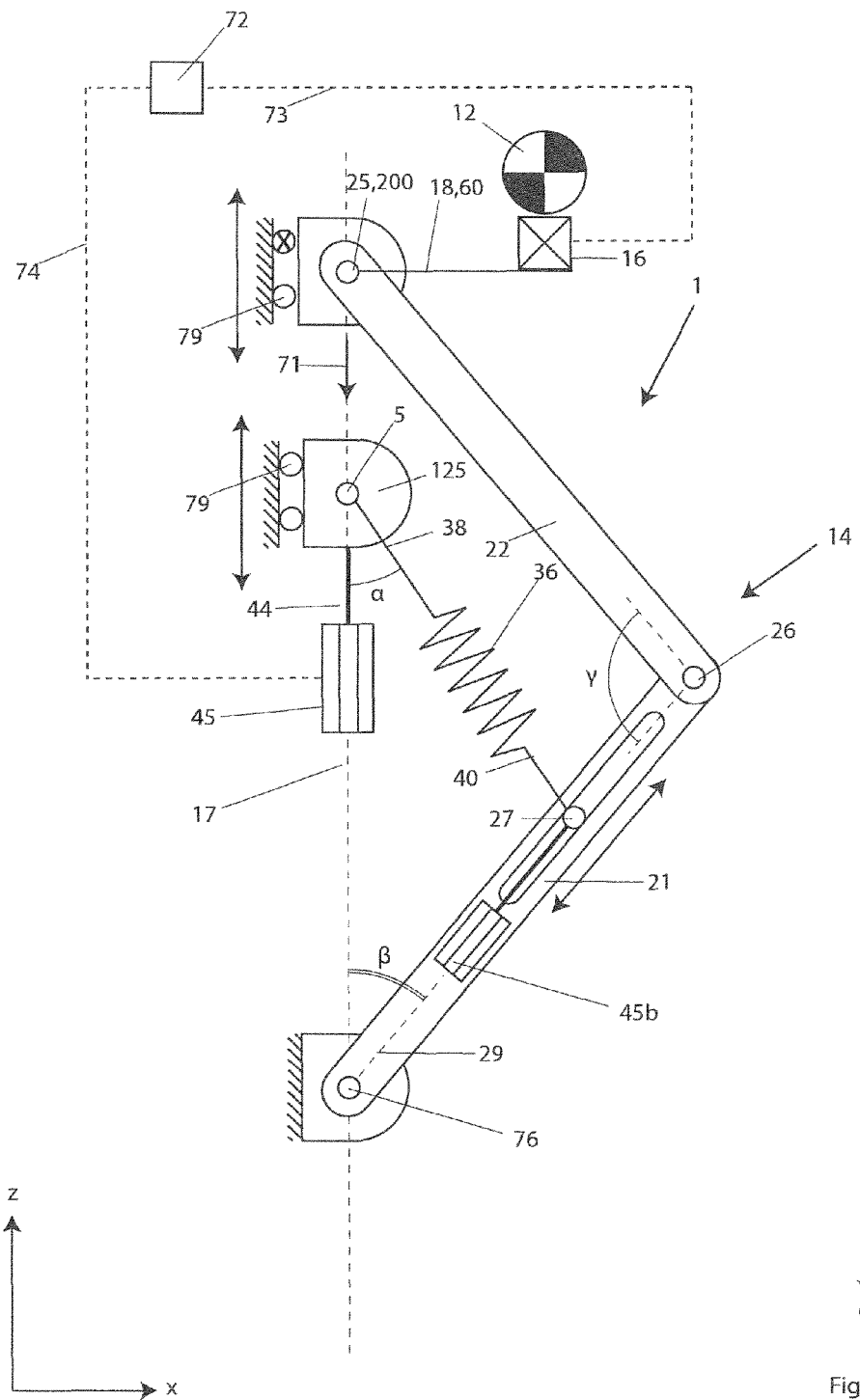
FIG. 6B shows a schematic side view of another embodiment according to the further aspect of the invention.

Turning to FIG. 6B, an embodiment is shown having two arms 21, 22 and a spring connection point 27 which is movable in a cam on the arm 21 by an actuator 45*b*. The lower end 29 of the first arm 21 is connected to a fixed base. The spring base point 52 is connected to a movable base 125 and is movable with actuator 45. In this embodiment, both ends of the spring can be adjusted. In use, the control device 72 receives the weight signal from the weighing device 16 and transmit a actuation signal to the actuators 45, 45*b*.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A spring balanced support device comprising:
at least a first arm and a second arm, the first and second arm forming an arm mechanism to which a mass may be coupled directly or indirectly at a mass coupling point, the first arm being connected at a first end thereof to its surroundings via a first movable pivot point, the first movable pivot point being movable along a movement axis of the first movable pivot point, wherein the second arm is coupled at a first end thereof to the surroundings via a second movable pivot point which is movable substantially parallel to said movement axis of the first movable pivot point, the first arm further being connected at a second end thereof, opposite to the first end of the first arm, to a second end of the second arm, opposite to the first end of the second arm, at an elbow pivot point,
the mass coupling point being balanced by at least one spring, one end of the spring being directly or indirectly connected to the arm mechanism at a spring connection point and, the other, opposite end of the spring being directly or indirectly connected to the surroundings at a spring base point,
wherein the movement axis of the first movable pivot point extends through the first movable pivot point and substantially parallel to a direction of a force exerted on the spring balanced support device at the mass coupling point due to the force of gravity on the mass, and
wherein the spring base point is located substantially on the movement axis of the first movable pivot point, or wherein the spring base point is located at a distance from said movement axis of the first movable pivot point along a line which intersects the movement axis of the first movable pivot point and which line extends substantially parallel to a pivot point axis of the first movable pivot point, and
wherein the first movable pivot point is movable along the movement axis of the first movable pivot point in order to adjust the spring balanced support device.

2. The spring balanced support device according to claim 1, wherein the arm mechanism is not connected to any fixed base and wherein each part of the arm mechanism is movable at least in a direction parallel to the axis.

3. The spring balanced support device according to claim 1, wherein the position of the spring connection point is fixed and non-adjustable, and wherein the position of the spring base point is fixed and non-adjustable.

4. The spring balanced support device according to claim 1, wherein the second movable pivot point is operable to be positioned at a predetermined distance from the spring base point, wherein a change in potential energy of the arm mechanism as a result of a movement of the first pivot point is substantially the same as a change in spring energy in the least one spring as a result of said movement.

5. The spring balanced support device according to claim 1, wherein the second movable pivot point is operable to be positioned near the spring base point and between the spring base point and the first movable pivot point during the adjusting process.

6. The spring balanced support device according to claim 1, further comprising a brake device constructed to:
during an adjusting step, fixate a position of the mass coupling point along said movement axis while allowing a movement of the first movable pivot point along said movement axis; and
during a balancing step, fixate the position of the first movable pivot point along said movement axis while allowing a movement of mass coupling point along said movement axis.

7. The spring balanced support device according to claim 6, wherein the spring balanced support device further comprises:
a weighing device configured to weigh the mass which is supported by a mass support member;
an actuator being constructed to move the first movable pivot point;
a control device being connected to the weighing device and to the actuator; and
wherein the control device is configured to control the actuator for adjusting the position of the first movable pivot point on the basis of a signal of the weighing device which is indicative of the measured weight of the mass.

8. The spring balanced support device according to claim 7, wherein the brake device is coupled to the control device, the control device being configured to fixate the position of the mass coupling point along the axis during the weighing of the mass.

9. The spring balanced support device according to claim 7, comprising:
a wagon comprising wheels or skidding members; and
a frame being connected to said wagon, the frame extending over a vertical distance wherein the arm mechanism and at least one spring are connected to said frame.

10. The spring balanced support device according to claim 1, comprising a transmission device being mechanically interposed between the mass and the arm mechanism, the transmission device being configured to cause a ratio of a vertical movement of the mass coupling point and a vertical movement of the mass itself to be less than 1:1.25 or more than 1:0.75.

11. The spring balanced support device according to claim 7, comprising a protruding arm which is connected directly or indirectly to the arm mechanism, wherein the protruding arm extends over a horizontal distance, wherein the protruding arm is connected to a carriage which is guided by a rail which extends parallel to said axis;
wherein the protruding arm is connected to the arm mechanism via a hinge having a vertical axis.

12. A spring balanced support device according to claim 11, further comprising a pulley device comprising an upper pulley, a lower pulley and an endless flexible member being supported by the upper and lower pulley and extending at least in part parallel to said rail, wherein the mass is connected to the mass coupling point via said endless flexible member.

13. A spring balanced support device according to claim 11, comprising one or more of the following brake members:
1) a first brake member for braking a vertical movement of the mass,
2) a second brake member for braking a horizontal movement of the second arm relative to the first arm,
3) a third brake member for braking the pivoting movement of the protruding arm about said vertical axis of said hinge, and/or,
4) a fourth brake member for braking the pivoting movement of the mass about a pivot axis,
wherein the one or more brake members are connected to the control device via communication lines, the control device being configured to switch the one of more brake members on or off, together or separately.

14. The spring balanced support device according to claim 1, further comprising a brake device constructed to:
during an adjusting step, fixate a position of the mass coupling point along said axis while allowing a movement of the first movable pivot point along said axis; or
during a balancing step, fixate the position of the first movable pivot point along said axis while allowing a movement of mass coupling point along said axis.

* * * * *